United States Patent
Verin et al.

(10) Patent No.: US 9,930,075 B2
(45) Date of Patent: Mar. 27, 2018

(54) RADIO ACCESS NETWORK CONTROL OF MEDIA SESSION

(71) Applicant: Athonet S.r.l., Trieste (IT)

(72) Inventors: Gianluca Verin, Trieste (IT); Karim El Malki, Trieste (IT)

(73) Assignee: ATHONET S.R.L., Trieste (IT)

( * ) Notice: Subject to any disclaimer, the term of this patent is extended or adjusted under 35 U.S.C. 154(b) by 163 days.

(21) Appl. No.: 14/901,209

(22) PCT Filed: Jun. 27, 2014

(86) PCT No.: PCT/IB2014/062658
§ 371 (c)(1),
(2) Date: Dec. 28, 2015

(87) PCT Pub. No.: WO2014/207712
PCT Pub. Date: Dec. 31, 2014

(65) Prior Publication Data
US 2016/0156676 A1    Jun. 2, 2016

(30) Foreign Application Priority Data
Jun. 28, 2013   (IT) .............................. MI2013A1081

(51) Int. Cl.
*G06F 13/00* (2006.01)
*H04L 29/06* (2006.01)
(Continued)

(52) U.S. Cl.
CPC ...... *H04L 65/1069* (2013.01); *H04L 65/1006* (2013.01); *H04L 65/1016* (2013.01);
(Continued)

(58) Field of Classification Search
CPC ............ H04L 65/1016; H04L 65/1069; H04L 65/4084; H04L 65/1006; H04L 65/4069; H04L 67/18; H04L 65/80; H04M 7/006
(Continued)

(56) References Cited

U.S. PATENT DOCUMENTS 9,686,373 B2 * 6/2017 Todd ................... H04L 67/2842
2011/0307624 A1 12/2011 Shatsky
(Continued)

FOREIGN PATENT DOCUMENTS

WO    2013057315 A2    4/2013

*Primary Examiner* — Kenneth R Coulter
(74) *Attorney, Agent, or Firm* — Volpe and Koenig, P.C.

(57) ABSTRACT

A method for controlling media communication session between a user and a receiving equipment via a core network is disclosed. The method includes checking a database to retrieve policy rules applicable to the user. The method also includes identifying the establishment of a default bearer for the user and analyzing all traffic packets originating from or directed to the user. The method further includes checking the establishment of a requested media communication session and determining the type of media session requested and established, and the IP addresses and ports of the user and the receiving equipment. The method also includes creating a dedicated bearer between the IP addresses and related ports of the already established media session, on the basis of the information retrievable from the packets belonging to the established media session and the database.

23 Claims, 14 Drawing Sheets

(51) Int. Cl.
*H04L 29/08* (2006.01)
*H04M 7/00* (2006.01)

(52) U.S. Cl.
CPC ...... *H04L 65/4069* (2013.01); *H04L 65/4084* (2013.01); *H04L 65/80* (2013.01); *H04L 67/18* (2013.01); *H04M 7/006* (2013.01)

(58) Field of Classification Search
USPC ........................................ 709/245, 227, 203
See application file for complete search history.

(56) References Cited

U.S. PATENT DOCUMENTS

| | | | |
|---|---|---|---|
| 2013/0091526 A1 | 4/2013 | Iyer et al. | |
| 2014/0219230 A1* | 8/2014 | Schierl ................. | H04W 72/08 370/329 |
| 2014/0237067 A1* | 8/2014 | Todd ................... | H04L 67/1031 709/213 |

* cited by examiner

RADIO ACCESS NETWORK CONTROL OF MEDIA SESSION

CROSS REFERENCE TO RELATED APPLICATIONS

This application is a 371 of International Application No. PCT/IB2014/062658 filed on Jun. 27, 2014, which claims the benefit of Italian Application No. MI2013A001081, which was filed on Jun. 28, 2013, and are incorporated herein by reference as if fully set forth.

FIELD OF INVENTION

The present invention is relative to a method and a network component to control media sessions which are established between a user and an IP network via a core network.

BACKGROUND

Wireless communication systems are widely deployed to provide various types of communication content such as voice, data, etc. These systems may be multiple access systems capable of supporting communication with multiple users by sharing the available resources (e.g. bandwidth and transmitted power).

Network priority is a way to obtain network bandwidth management and control for data, video and voice traffic. This kind of management is termed Quality of Service (QoS) and is controlled using policy-based network processes. Quality of Service comprises requirements on all the aspects of a connection, such as service response time, loss, signal-to-noise ratio, cross-talk, echo, interrupts, frequency response, loudness levels, and so on. In policy-based networking for an Internet Protocol (IP)-based network, a policy refers to a formal set of statements that define the manner of controlling and processing communications and resource allocation among its clients, i.e. users of the IP network. In policy-based networking, the administrator uses policy statements in order to define a particular level of priority and processing of communications for each of the kinds of services according to defined parameters.

In general, policies may be characterized by specification of rules and expected enforcement of the rules by various entities in the network. The rules may be statically configured or dynamically updated; specified by end users, network operators, or service providers; and may be considered as guidelines or mandates depending on particular policy enforcement requirements.

Once a subscriber is connected to the network, conventional mobile cellular networks comprise a Policy Control and Charging (PCC) functionality that identifies packets that are sent or received and performs actions based on such a set of rules defined in the policy (e.g., deliver the packet, discard the packet, apply charging). The PCC is formed by the Policy Control Enforcement Function (PCEF) and the Policy Control Resource Function (PCRF). The PCC needs to be dynamic because it needs to react to the different applications that a subscriber is using. For example, a successful establishment of a Voice over IP (VoIP) call will require the mobile network's IMS (IP Multimedia Subsystem) to instruct the PCC in order to allow delivery of packets belonging to the VoIP call. This is limiting because a mobile service provider may not have access to a specific application server (e.g. IMS) while wanting to apply policy rules to the respective service (e.g. VoIP calls). Furthermore, other applications that could benefit from policy functionality will not implement IMS functionality and will not exchange information with the PCC functionality in the mobile network. One example is video (e.g. IPTV, Youtube) where the video server is typically unable to interact with the PCC. This prevents an operator from prioritizing and giving dedicated radio bandwidth to any of these services.

SUMMARY OF THE INVENTION

Provided herein are method and system for managing and/or enforcing one or more policies for managing internet protocol ("IP") traffic among multiple accesses of a network. The access employs a radio access technology ("RAT"). Moreover, a policy is present for managing bandwidth among the multiple accesses. The policy across the multiple accesses may rely on intelligent and comprehensive policies that are driven by numerous criteria, such as, for example, operator policy, user subscription parameters, application requirements, network conditions, location, available power, etc.

The method may further include managing IP traffic associated with at least one wireless transmit and/or receive unit ("WTRU") among the plurality of accesses responsive to the adapted rules.

In particular the disclosed method and apparatus are apt to control and manage the IP traffic flow without the need of a complex architecture such as IMS.

In a first aspect, the disclosure relates to a method for controlling a media communication session between a user identified by a user identifier and a receiving equipment via a core network and an IP network external to said core network, said user accessing said core network via a radio access network and said network including a gateway to said external IP network, including the steps of:
  Checking, when said user connects to said core network, a database to retrieve policy rules applicable to said user according to the user identifier and which relate to one or more media sessions;
  Identifying the establishment of a default bearer for said user on said core network;
  Analyzing traffic packets originating from or directed to said user between said access network and said core network;
  Checking the establishment of a requested media communication session between the user and the receiving equipment;
  Determining, for each packet belonging to the established media communication session, the type of media session requested and established, and the IP addresses of said user and said receiving equipment, between which the media session is established;
  forcing such core network and/or radio access network and/or said gateway to create, if such policy rules allow, a dedicated bearer between said user and said gateway to said external IP network with Quality of Service for the packets belonging to the already established media session, said Quality of Service depending on the specific media session, said dedicated bearer being established between the IP addresses and related ports of the already established media session, said dedicated bearer being created on the basis of the information retrievable from said packets belonging to said established media session and said database.

The types of media session included are for example: voice, video, message & event data alert communication, human communication (voice and/or video), machine to human (e.g., video streaming), machine to machine communication (sensors' networks, alarms, video alarms). Combinations thereof are also included, such as multimedia sessions.

The disclosed method relates to a communications system which enables wireless users to communicate, in the above specified sense, with each other and/or access the content of an IP network, in particular gaining access to an external IP based services, according to a given policy. Such services are for example VoIP call, video streaming services, Skype calls or video-calls, YouTube server accesses, etc. The communications system, for example, may employ one or more channel access methods, such as code division multiple access (CDMA), time division multiple access (TDMA), frequency division multiple access (FDMA), orthogonal FDMA (OFDMA), single-carrier FDMA (SC-FDMA), and other technologies known in the art, as it will be better detailed below.

The meaning of "external" IP network relates to a network external to the core network. Preferably such an IP network is the Internet, a private corporate network or an operator's IP network. In addition, the external IP network can be the IMS itself. There is no need that the external IP network belongs to a different operator: core network and IP network, external to the core network, can belong to the same operator of a wireless communication network.

The external IP network is connected to the core network via a gateway belonging to the core network. Packets are routed from the core network to the external IP network via the gateway. Then the packets, via the gateway, are routed back into the core network from the external IP network.

The user connects to the communications system via a radio access network ("RAN"). The RAN is connected to a core network which in turn allows connection to additional networks than the external IP network, such as public switched telephone network ("PSTN"), internet, and other IP networks.

The user might desire to establish a media session with a receiving equipment via the external IP network. The receiving equipment can be either another user, or to a server via the IP network, where a specific application is present.

A user may be any type of device configured to operate and/or communicate in a wireless environment. By way of example, the user may be configured to transmit and/or receive wireless signals, and may include a user equipment, a mobile station, a fixed or mobile subscriber unit, a pager, a cellular telephone, a personal digital assistant ("PDA"), a Smartphone, an iPhone, a laptop, a netbook, a personal computer, a wireless sensor, consumer electronics, and other transmitter/receivers known in the art. The user can be connected to a human or also to a machine.

The user is identified by a user identifier, which is for example an International Mobile Subscriber Identity (IMSI) present in a Subscriber Identity Module (SIM) card, an Universal Subscriber Identity Module (USIM), Removable User Identity Module (R-UIM), a CDMA Subscriber Identity Module (CSIM), a virtual SIM and/or a given terminal serial number such as an International Mobile Equipment Identifier (IMEI) of the user. Any other user identifier can be used, as long as it uniquely identifies the user.

Preferably, RAN includes one or more base station configured to transmit and/or receive wireless signals within a particular geographic region, which may be referred to as a cell.

According to the standard, the user requests a connection to the network via the RAN, and a default bearer is established. The way in which such a default bearer is established is according to the known art.

The connection requested by the user to the core network may be established or also denied according to the standard procedures depending on the type of core network and RAN and the applicable standard policy, the traffic in the network, etc.

A bearer is a logical end to end transmission path between the user and the core network and/or gateway to the external IP network. Each default bearer may be associated with a set of QoS parameters that describe the properties of the transport channel, including bit rates, packet delay, packet loss, bit error rate, and scheduling policy in the radio base station.

In a LTE network, a default bearer can for example be established between the user and a PDN gateway for the access to the external IP network such as the Internet. A default bearer is for example created every time a user attaches to the PDN gateway.

Moreover, the network, according to known art, assigns to the user a dynamic or static IP address.

According to the disclosed method, the establishment of the default bearer is checked and the IP address of the user is identified. This identification is made intercepting and analyzing the packets from/to the user and the core network.

After the bearer has been established, the user might request a media connection to a receiving equipment. The media connection between the user and the receiving equipment may be established (or also denied) according to the standard procedures depending on the type of core network and RAN and the applicable standard policy, the traffic in the network, etc.

The media connection is using the default bearer already established between the user and the gateway to the external IP network, i.e., packets relative to the media session flow within the default bearer.

According to the method, preferably before or as soon as the media communication session is established, a database is checked. The database entry is the user identifier which identifies the user to/from which the media communication session is directed. For each user identifier, a set of rules is stored inside the database. To each user therefore a plurality of IP addresses is connected, the plurality of IP addresses for example indicating the servers relative to the services to which the user can accede using the disclosed policy.

It is possible according to the disclosed method to read the whole database at regular intervals or when the connection from the user to the core network is requested.

The set of rules associated to each user are preferably modifiable, for example by an operator providing services associated to the network and to which the user is a subscriber.

According to the disclosed method, all traffic between the RAN and the core network, is checked, both data and signalling traffic. In particular, different possibilities arises: all traffic packets originating from or directed to the user between said access network and said core network are analyzed either before they enter into the core network or in the core network itself.

In addition, in a preferred embodiment, also the packets from the gateway to the external IP network and the IP network itself are analyzed.

This check of the packets can be performed by a node in the core network itself, or by an entity connected to the core network and external to the latter, which will be better described below. Alternatively, the check can be performed by an entity (node) located in the gateway to the external IP network or into the RAN.

From the analysis of the packets travelling in the core network and/or between RAN and the core network and/or between the gateway to the external IP network and the IP network and belonging to the media session, the disclosed method determines the type of media session requested and established, and the two IP addresses and related ports, between which the media session is established.

It is to be understood that the IP addresses of the user and of the receiving equipment may dynamically change. For example, when a VoIP call is requested to call an end user, the request is directed towards a given SIP server, which has a given IP address, and then it is routed towards the end user, which has a different IP address. Thus the disclosed method keeps track of the IP address of the equipment with which the communication is established.

Going back to the database, the rules of the database are checked. In case the rules allow, the disclosed method includes communicating to the core network and/or to the Radio access network and/or to the gateway to the external IP network to force such core network and/or radio access network and/or gateway to create a dedicated bearer with Quality of Service for the packets belonging to the already established media session. The Quality of Service depends on the specific media session, and the dedicated bearer is established between the IP addresses and related ports of the already established media session, said dedicated bearer being created on the basis of the information retrievable from said packets belonging to said established media session and said database.

As said, a bearer is a logical end to end transmission path between the user and the gateway to the external IP network. Each bearer is associated with a set of QoS parameters that describe the properties of the transport channel, including bit rates, packet delay, packet loss, bit error rate, and scheduling policy in the radio base station.

In LTE a dedicated bearer is for example defined in the standard. In UMTS, dedicated bearer activation can be considered as a Secondary PDP context activation in 2G and 3G.

In order to direct packets into the dedicated bearer, for example, according to the disclosed embodiments, a filter is established, according to an embodiment using the traffic flow templates (TFT). TFT's contain packet filtering information to identify and map packets to specific bearers. The filters may for example contain five parameters, commonly referred to as a 5-tuple. The disclosed filters contain any combination of parameters at IP and transport layer such as but not limited to:

The source IP address;
The destination IP address;
The source port number;
The destination port number;
The protocol identification (i.e., TCP or UDP).

Alternatively or in addition, other parameters which can be included are:

IPv4 remote address type;
IPv4 local address type;
IPv6 remote address type;
IPv6 remote address/prefix length type;
IPv6 local address/prefix length type;
Protocol identifier/Next header type;
Single local port type;
Local port range type;
Single remote port type;
Remote port range type;
Security parameter index type;
Type of service/Traffic class type;
Flow label type;

In the disclosed method, the filters are therefore created without intervention of the IMS, but simply analyzing the content of the packets flowing between RAN and core network and applying the policy described in the database. First the packets relating to the user's attachment and default bearer's creation are analyzed, and then the packets relating to the established media connection are examined in order to obtain all necessary information to set up the filters necessary to force the core network and/or the gateway and/or the RAN to create the dedicated bearer for such a media session.

According to a preferred embodiment, before the creation of a dedicated bearer with Quality of Service for the packets belonging to the already established media session, the method includes the step of forcing such core network and/or radio access network and/or gateway to create, if such policy rules allow, a dedicated bearer with Quality of Service for the packets belonging to the media session establishment signaling messages.

In this way also the signaling traffic and not only the data traffic is using a dedicated bearer: in other words the packets of the communication relative to the establishment of the media session can also flow in a dedicated bearer. This bearer can be created immediately, e.g. as soon as a user attaches to the core network, or after the first signaling packets requesting a media session have been sent.

Preferably, forcing the core network and/or radio access network and/or gateway to create a dedicated bearer includes:

Verifying in said database whether said user is allowed to establish media communication session of the type requested; and
In the affirmative case, creating said dedicated bearer.

According to the disclosed method, all the packets flowing between the RAN and the core network and/or from gateway to the external IP network are examined and the type of media communication session is determined. Such a media session for example can be a Youtube video streaming, a Skype communication, a VoIP communication, TV channel streaming, etc. According to the disclosed embodiments, preferably in the database, associated to each user, as identified by the user identifier, a list of possible media communication session types is present and in case the established media session belongs to the list of possible types, then according to the method, the core network or the RAN or the gateway is forced to create a dedicated bearer for the media session.

This is done automatically, which means that the dedicated bearer is created on the basis of the information retrieved from the packets and the information present in the database, without any other external communication.

Alternatively or in addition, according to a preferred embodiment, forcing the core network and/or radio access network and/or the gateway to create a dedicated bearer includes:

Determining the geographical location of said user;
Verifying in said database whether said user is allowed to establish media communication session in said geographical location; and
In the affirmative case, creating said dedicated bearer.

Preferably, in the database, associated to each user, a list of possible locations from which the user is allowed to obtain a media communication session is present and in case the actual location of the user belongs to the list of possible geographical locations, then according to the method, the core network and/or the RAN and/or the gateway is forced to create a dedicated bearer for the media session.

Also in this case the dedicated bearer is created automatically.

Alternatively or in addition, according to a preferred embodiment, said forcing the core network and/or radio access network and/or gateway to create a dedicated bearer includes:
- Verifying in said database whether said user is allowed to establish media communication session with said receiving equipment; and
- In the affirmative case, creating said dedicated bearer.

In other words, in the database a list of authorized IP addresses is present, each IP address corresponding to a receiving equipment. If the receiving equipment, which can be either the endpoint of the desired media communication or a server that re-directs the communication to the real endpoint, belongs to the authorized list, the dedicated bearer is created.

Alternatively or in addition, according to a preferred embodiment, forcing the core network and/or radio access network and/or gateway to create a dedicated bearer includes:
- Determining the media stream requested by said user;
- Verifying in said database whether said user is allowed to access said media stream; and
- In the affirmative case, creating said dedicated bearer.

Such a media stream for example can be a YouTube video channel on classical music. According to the disclosed embodiments, preferably in the database, associated to each user, a list of possible media streams is present and in case the requested media stream belongs to the list of possible streams' types, then according to the method, the core network and/or the RAN and/or the gateway is forced to create a dedicated bearer for the media session.

Preferably, said media session is a VoIP session or a streaming session.

Preferably, said receiving equipment is an application server or a SIP server or another user.

According to a preferred embodiment, in case there is no correspondence between the media session and the policy rules, e.g., in case the requested media session is not belonging to the allowed media sessions for such a user, or the server requested is not among the list of allowable servers, etc., the disclosed method includes the step of tearing down and/or blocking said media session (which was already established) between said user and said receiving equipment.

In this way, there is no communication between the user and the receiving equipment at all.

Preferably, the Quality of Service for the dedicated bearer includes one or more of the following parameters: Guaranteed Bit Rate, Maximum Bit Rate, Quality of Service Class Identifier, Allocation and Retention Priority, Differentiated Services Code Point.

In the disclosed embodiments, the QoS depends on the type of media session which is requested by the user. Therefore, a voice session is going to have a different QoS than a video session. The QoS can be associated to a dedicated bearer in different ways, for example determining one or more of the parameters above listed. As said, these parameters are different depending on the type of session which is transported in the dedicated bearer.

Preferably, the method also includes:
- Counting the number of media communication sessions performed by said user within a time frame;
- Establishing said dedicated bearer only if said number of media sessions performed within said time frame is below a given threshold.

In other words, for each user a counter is present and stored in the database, or in another suitable location. In case there is an upper limit of the possible media sessions which can be established by a user, the disclosed method includes avoiding establishing any further dedicated bearer if the number of media sessions has exceeded such an upper limit.

Advantageously, the disclosed method includes:
- Checking in said database the maximum uplink bitrate and/or the maximum downlink rate that said user is allowed to use;
- Establishing said dedicated bearer only if said media communication session requires an uplink and/or downlink rate equal to or below said maximum uplink bitrate and/or said maximum downlink rate.

According to the disclosed embodiments, the dedicated bearer is created only if the uplink or downlink rate is satisfying the extra requirement(s) optionally present in the database. As said, this check is made first—from the analysis of the packet—understanding the type of media session established and then checking the downlink or uplink bitrate of the same.

According to the disclosed embodiments, preferably the method includes:
- Determining the traffic load of said core network and/or radio access network;
- Establishing said dedicated bearer only if said traffic load is below a given threshold.

The traffic load is also obtained by analyzing the packet flow in the core network and/or access network.

Preferably, the method includes:
- Verifying in said database the priority access value of said user;
- Comparing said priority access value with a stored emergency access value;
- In case the priority access value of said user is equal to or greater than the stored emergency access value, tearing down the dedicated bearer and/or blocking network access of other user(s) having said priority access value lower than said emergency value;
- Establishing a dedicated bearer for said user having said priority access value equal to or greater than said emergency access value.

In this way, a certain priority is given to users, in other words, the network can be used depending on the priority assigned to all users. This priority value is stored in the database. A user having a priority equal to or greater than the emergency access value will be allowed to communicate, while other users having lower priority values will be denied and/or will have their dedicated bearer torn down. This allows having always the possibility to establish a dedicated bearer for special groups of users, for example a group of users belonging to a special organization, such as a police force, airport controllers, etc.

Advantageously, the method includes:
- Verifying in said database the priority access value of said user;
- Comparing said priority access value with the priority access value of all other user(s) and determining the lowest priority;
- In case the priority access value of said user is greater than the lowest priority access value of all other user(s), tearing down the dedicated bearer or blocking network access of another user having said lowest priority access value;
- Establishing a dedicated bearer for said user having said priority access value greater than said lowest priority access value.

In this way, the user having the lowest priority value is "expelled" from the network if a user having a higher priority needs to establish a media session.

Preferably, the priority access value of said user has a corresponding Quality of Service Allocation and Retention Priority value.

According to a second aspect, the disclosure relates to an apparatus configured to implement a policy control function in a telecommunication network for controlling media communication session; said telecommunication network including a core network having a gateway to an external IP network, a radio access network, and the IP network external to said core network, the apparatus comprising:

A database including policy rules applicable to users of said telecommunication network according to a user identifier and which relate to one or more media sessions;

A first detector apt to identify the establishment of a default bearer for a user on said core network;

A second detector apt to identify the establishment of a requested media communication session between the user and the receiving equipment;

An analyzer apt to analyze all traffic packets originating from or directed to said user between said access network and said core network and/or a gateway to an external IP network and to determine for each packet belonging to the established media communication session, the type of media session requested and established, and the IP addresses and ports of said user and said receiving equipment, between which the media session is established;

A policy enforcer apt to force such core network and/or radio access network and/or said gateway to create, if such policy rules allow, a dedicated bearer between said user and said gateway with Quality of Service for the packets belonging to the already established media session, said Quality of Service depending on the specific media session, said dedicated bearer being established between the IP addresses and related ports of the already established media session, said dedicated bearer being created on the basis of the information retrievable from said packets belonging to said established media session and said database.

Analyzer, enforcer and detector can be separated elements, or the same element, hardware or software.

Preferably, said first and second detector, said analyzer and said policy enforcer are part of the same node.

In other words, the various functions are performed by a single device.

In an advantageous embodiment, said first and second detector, said analyzer and said policy enforcer are part of said core network.

Being part of the core network means that they can be also part of an already existing node of the core network, such as for example the gateway to the external IP network, or they can be additional node(s) of the core network.

Alternatively, in a different preferred embodiment, said first and second detector, said analyzer and said policy enforcer are part of said radio access network.

In this way the policy is applicable via the base station and all the functions are performed by it.

BRIEF DESCRIPTION OF THE DRAWINGS

The invention will be better understood with reference to the appended drawings, wherein.

DETAILED DESCRIPTION OF THE PREFERRED EMBODIMENTS

Figure 1:
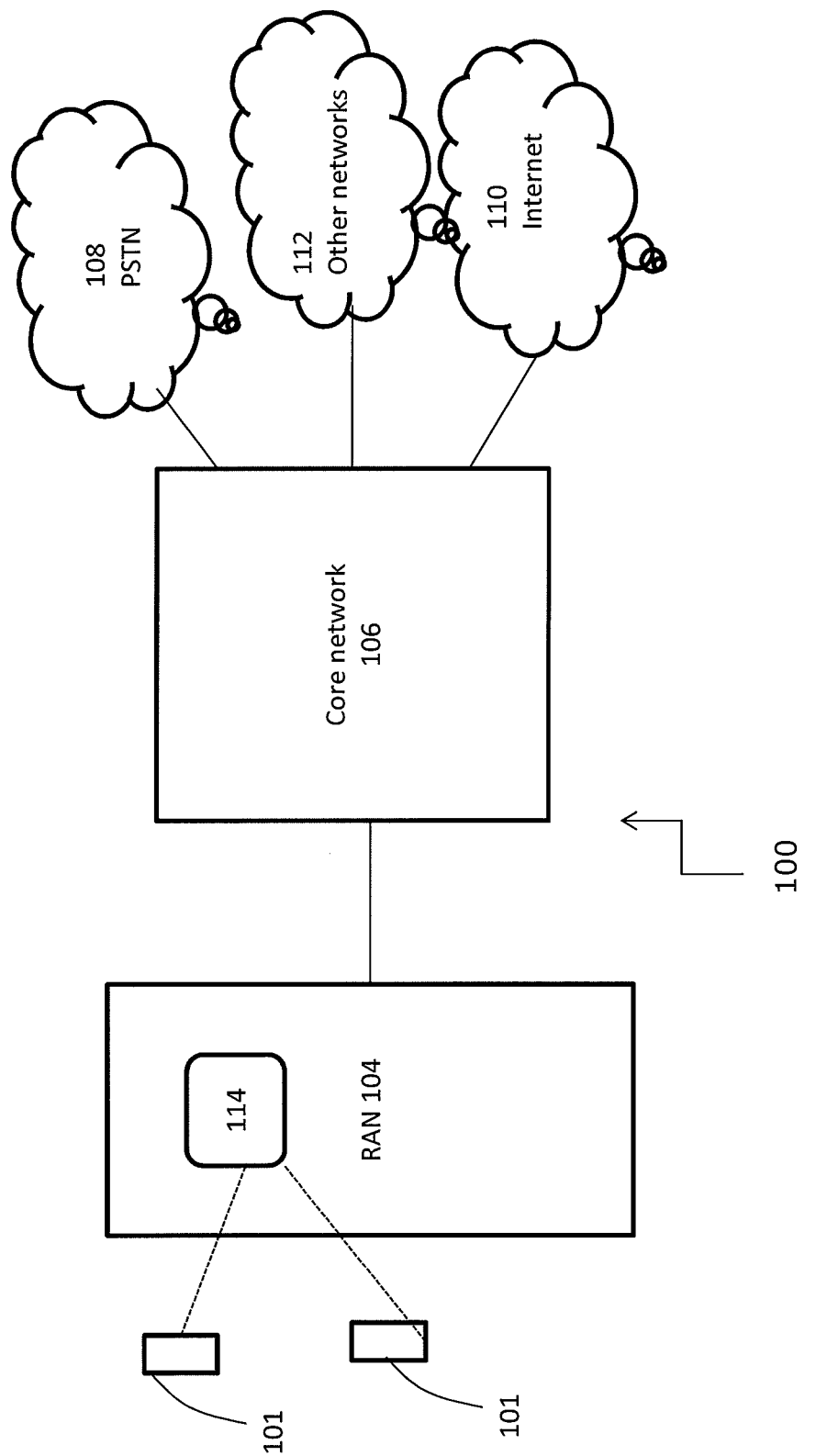
FIG. 1 is a schematic representation of a communication system where the method of the invention is implemented.
Figure 2:
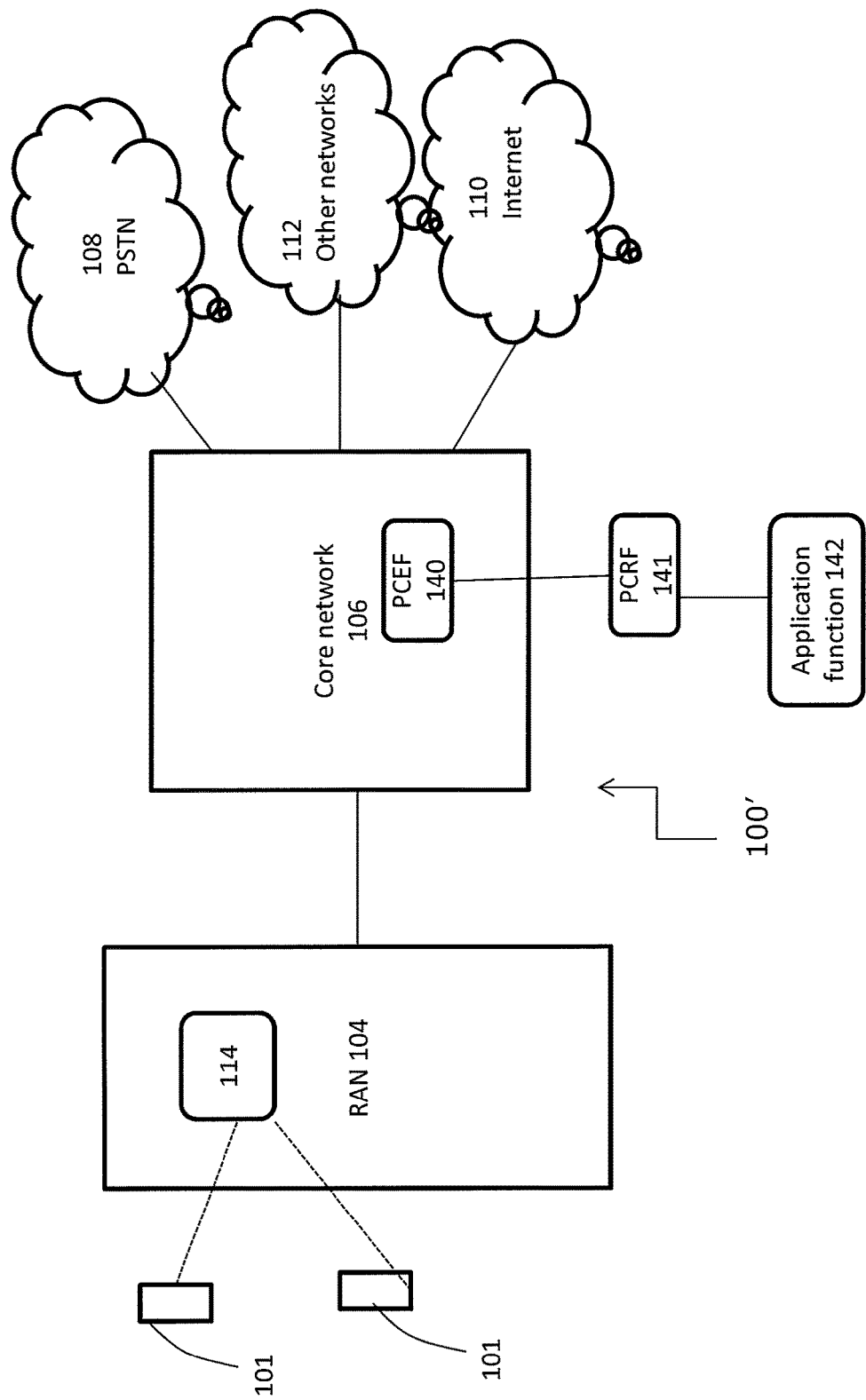
FIG. 2 is a schematic representation of a different communication system where the method of the invention is implemented.

FIG. 1 or 2 are schematic representations of possible communications systems 100 in which one or more disclosed embodiments of the present invention may be implemented. In general, the communications system 100 defines an architecture that supports multiple access systems over which multiple wireless users may access and/or exchange (e.g., send and/or receive) content, such as voice, data, video, messaging, broadcast, etc.

The multiple access systems may include respective accesses; each of which may be, for example, an access network, access point and the like. In various embodiments, all of the multiple accesses may be configured with and/or employ the same radio access technologies. Some or all of such accesses may be owned, managed, controlled, operated, etc. by either a single mobile network operator and/or carrier or multiple operators/carriers.

The communications system 100 may enable the wireless users to access the content through sharing and/or distribution of system resources, including, for example, wireless bandwidth. The communications system 100, for example, may employ one or more channel access methods, such as code division multiple access (CDMA), time division multiple access (TDMA), frequency division multiple access (FDMA), orthogonal FDMA (OFDMA), single-carrier FDMA (SC-FDMA), and other technologies known in the art, as it will be better detailed below.

With now reference to FIG. 1, the communications system 100 may include wireless transmit/receive units ("WTRUs") or—shortly—users 101, a radio access network ("RAN") 104, a core network 106, a public switched telephone network ("PSTN") 108, Internet 110, and other networks 112. Any number of networks might be connected through the core network 106.

Each of the WTRUs 101 may be any type of device configured to operate and/or communicate in a wireless environment. By way of example, the WTRUs 101 may be configured to transmit and/or receive wireless signals, and may include a user equipment ("UE"), a mobile station, a fixed or mobile subscriber unit, a pager, a cellular telephone, a personal digital assistant ("PDA"), a Smartphone, an iPhone, a laptop, a netbook, a personal computer, a wireless sensor, consumer electronics, and other transmitter/receivers known in the art.

Preferably, RAN 104 includes one or more base station 114. As described in more detail below, the RAN 104 may include base stations and/or network elements other than the base station 14 (not shown), such as a base station controller ("BSC"), a radio network controller ("RNC"), relay nodes, etc. The base station 114 may be configured to transmit and/or receive wireless signals within a particular geographic region, which may be referred to as a cell (not shown in the appended drawings).

The base station 114 may be any type of device configured to wirelessly interface with at least one of the WTRUs 101 and may facilitate access to one or more communication networks, such as the core network 106 The base stations 114 may be, for example, any of a base transceiver station ("BTS"), Node-B ("NB"), evolved NB ("eNB"), Home NB ("HNB"), Home eNB ("HeNB"), enterprise NB ("ENT-NB"), enterprise eNB ("ENT-eNB"), a site controller, an access point ("AP"), a wireless router, and the like. Although depicted as a single element, each of the base stations 114 may nonetheless include any number of communicatively coupled base stations and/or network elements. The term "H/E(e)NB" is used hereinafter, for simplicity of exposition, to refer to a HNB, a HeNB, an ENT-NB, an ENT-eNB, a base station of a trusted-3GPP access network or the like.

The base stations 114 may communicate with one or more of the WTRUs 101 over an air interface 116, which may be any suitable wireless communication link. The air interface 116 may be established using any suitable RAT.

More specifically, as noted above, the communications system 100 may be a multiple access system and may employ one or more channel access schemes, such as CDMA, TDMA, FDMA, OFDMA, SC-FDMA, and the like. For example, the base station 114 in the RAN 104 and the WTRUs 101 may implement a radio technology such as Universal Mobile Telecommunications System ("UMTS") Terrestrial Radio Access ("UTRA"), which may establish the air interface 116 using wideband CDMA ("WCDMA"). WCDMA may include communication protocols such as High-Speed Packet Access ("HSPA") and/or Evolved HSPA ("HSPA-F"). HSPA may include High-Speed DL Packet Access ("HSDPA") and/or High-Speed UL Packet Access ("HSUPA").

In another embodiment, the base station 114 and the WTRUs 101 may implement a radio technology such as Evolved UMTS Terrestrial Radio Access ("E-UTRA"), which may establish the air interface 116 using Long Term Evolution ("LTE") and/or LTE-Advanced ("LTE-A").

In other embodiments, the base station 114 and the WTRUs 101 may implement radio technologies such as IEEE 802.16 (i.e., Worldwide Interoperability for Microwave Access ("WiMAX")), CDMA2000, CDMA2000 12X, CDMA2000 EV-DO, Interim Standard 2000 ("IS-2000"), Interim Standard 95 ("IS-95"), Interim Standard 856 ("IS-856"), Global System for Mobile communications ("GSM"), Enhanced Data rates for GSM Evolution ("EDGE"), GSM EDGE ("GERAN"), and the like.

The RAN 104 is in communication with the core network 106, which may be configured to provide voice and data services to one or more of the WTRUs 101.

The core network 106 may also serve as a gateway for the WTRUs 101 to access the PSTN 108, the Internet 110, and/or other networks 1 2. The PSTN 108 may include circuit-switched telephone networks that provide plain old telephone service. The Internet 110 may include a global system of interconnected computer networks and devices that use common communication protocols, such as the transmission control protocol ("TCP"), user datagram protocol ("UDP") and the internet protocol ("IP") in the TCP/IP internet protocol suite. The network 100 may include additional wired or wireless communications networks owned and/or operated by other service providers.

The above are only examples of communication systems 100 to which the present invention can be applied, however other type of communication systems are possible as well. With reference to FIG. 2, according to the prior art, a conventional communication system 100' further includes an Application Function (AF) 142 which dynamically communicates policy rules to a Policy Control Resource Function (PCRF) 141 which in turn communicates with a Policy Control Enforcement Function (PCEF) 140. PCEF is generally part of the mobile core network 106 which enforces such rules. The main embodiment in known communication systems 100' of the Application Function 142 is the IP Multimedia Subsystem (IMS) utilized to support Voice over IP services in mobile networks. In FIG. 2, the same reference numerals indicate the same elements of FIG. 1 already described.

Figure 3:
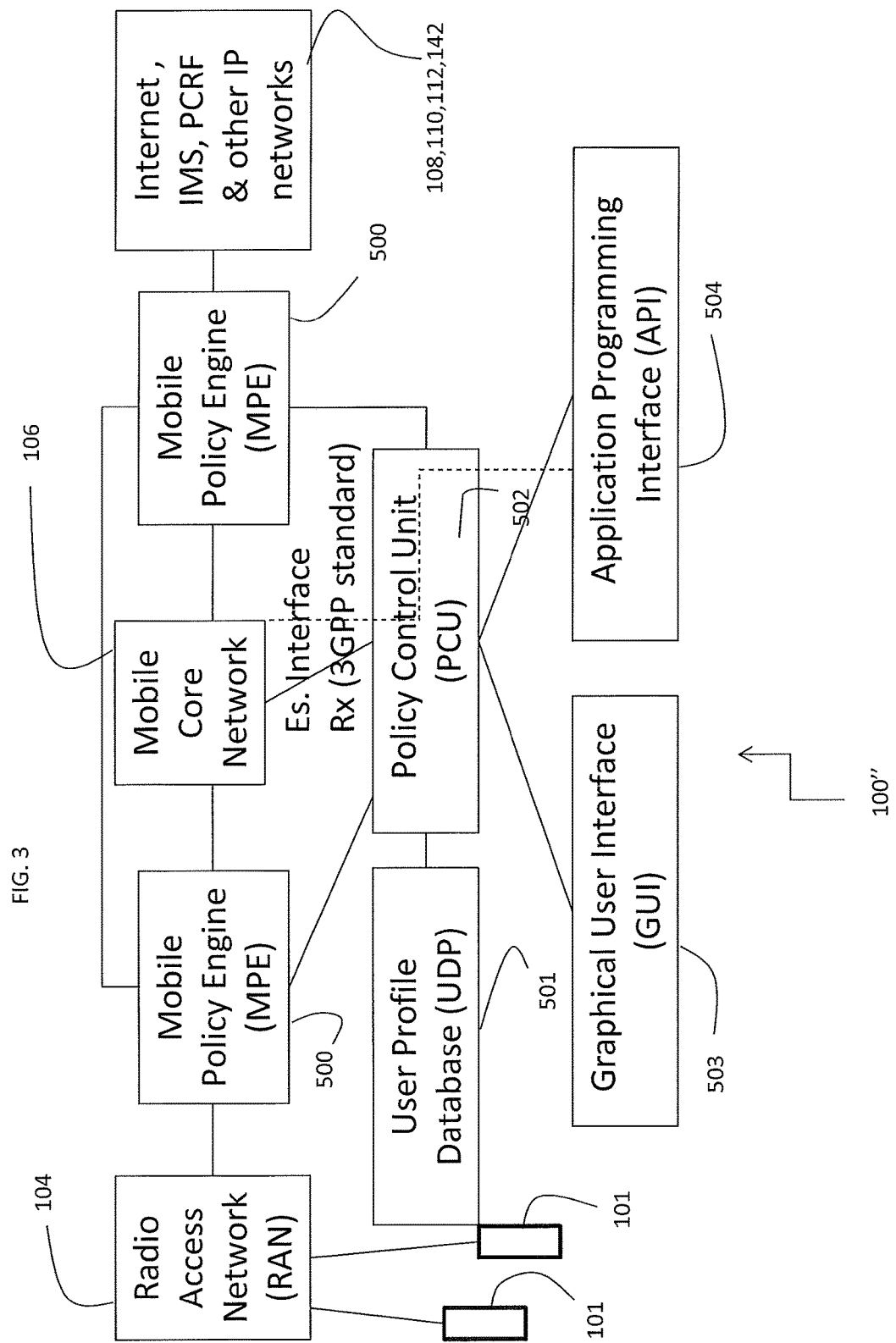
FIG. 3 is a more detailed schematic representation of a communication network where the method of the invention is implemented.
Figure 4:
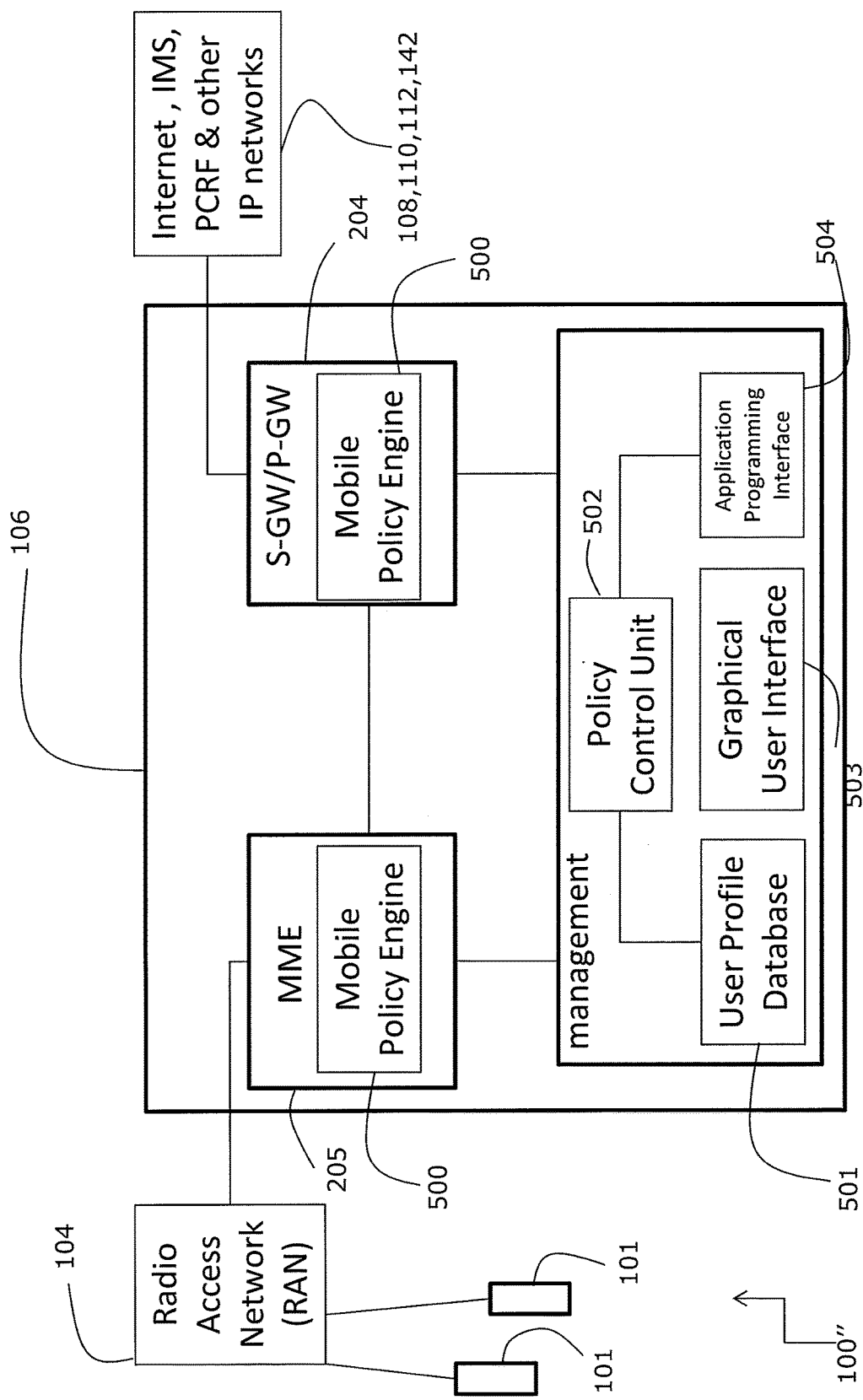
FIG. 4 is a more detailed schematic representation of a further different embodiment of a communication network where the method of the invention is implemented.

With now reference to FIGS. 3 and 4, two different embodiments of the communication system 100" according the disclosed embodiments are now depicted. As above, the same reference numerals indicate the same elements of FIGS. 1 and 2.

Network 100" includes a RAN 104, a core network 106 and a IP network 110, 112, 142 external to the core network. The elements which have the same reference numeral as in FIGS. 1 and 2 are analogue to the elements having the same number already described in detail with reference to FIGS. 1 and 2 and communication systems 100 and 100'.

According to a first aspect of the present invention, the network 100" includes a Mobile Policy Engine (MPE) 500, implemented as a part of the Core Network 106 (embodiment of FIG. 4) or as an external entity to the core network 106 (embodiment of FIG. 3).

Figure 3A:
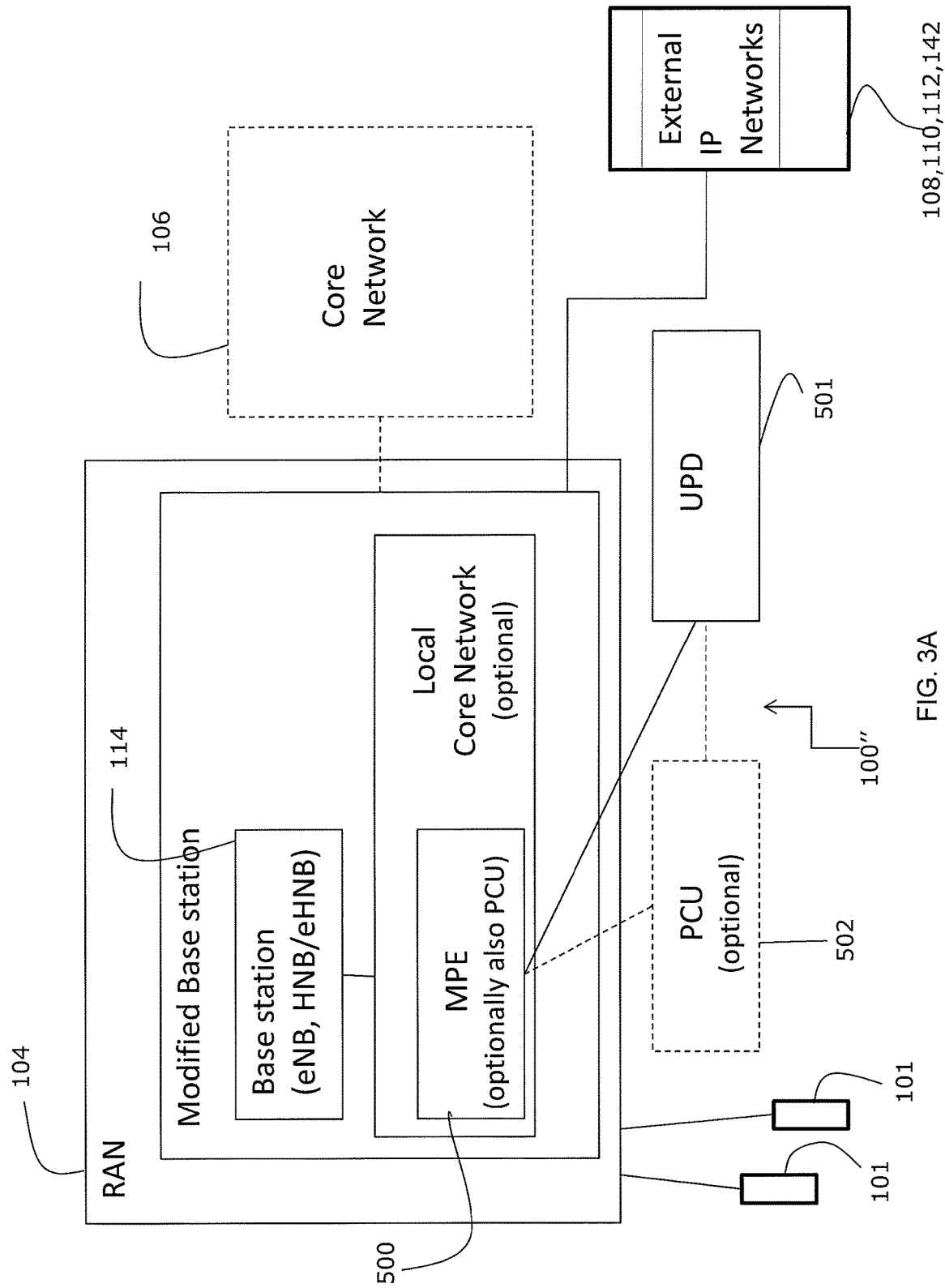
FIG. 3A is a more detailed schematic representation of a different embodiment of a communication network where the method of the invention is implemented.

Alternatively, with reference to FIG. 3A, the MPE may optionally be implemented as part of E-UTRA and of the BTS, such as the eNB or HeNB. The MPE may also be implemented as part of a local core network within the E-UTRA and/or BTS. Such an implementation simplifies the deployment of the network described in this invention by using modified compact base stations that can operate stand-alone using the complete network functionality.

The MPE is apt to apply a given policy (contained in a database as detailed below) to users, such as WTRUs, which connects to the network 100". The policy is mainly concerned with the establishment of media communication session.

The MPE 500 is connected to the Radio Access Network RAN 104 and to a gateway 204 to an external IP data network(s) 108, 110,112, which can be either Internet 108 or any other IP network 112 such as a proprietary IP network. The gateway could be any node of the core network equipped for interfacing with the external IP network. For example, in an LTE protocol, the gateway could be a PGW (PDN Gateway).

The PDN Gateway provides connectivity from the WTRU to external packet data networks by being the point of exit and entry of traffic for the WTRU. A WTRU may have simultaneous connectivity with more than one PGW for accessing multiple PDNs. More specifically, when the WTRU connects to the network 100" via RAN 104, a default bearer is created, according to the standard.

In this initial communication between the WTRU and the core network 106, in order to perform the attachment procedure and the creation of a dedicated bearer, information has been exchanged between the core network or the RAN and the WTRU.

A part or all of this information is retrieved by the MPE 500, which intercepts and analyzes the packets between the RAN and the core network.

Then the WTRU requests a media session. The media session can be established between the WTRU and another WTRU or between the WTRU and a server, more in general, between the WTRU and any other fixed or wireless device reachable using an IP address, which will be called receiving equipment. The packets belonging to the media session flow in the default bearer already created according to the standard between the WTRU and the gateway to the external IP network, so that communications can be obtained with the external IP network.

Immediately after the establishment of the requested media session, the MPE 500 analyzes also the content of the packets flowing within the default bearer and relating to it. Intercepting and analyzing the packets, allows the MPE to retrieve additional information, in addition to that already obtained. This information is used in order to set a filter for the packets flowing from/to the WTRU which has been connected to the network 100". In other words, the MPE has to be "intelligent" so that it can intercept and analyze the packets and detect the information needed, as detailed below. The packets to be intercepted are both the packets before the creation of the default bearer and also the packets flowing in the default bearer belonging to the media session. The packets are intercepted and analyzed in order to obtain the necessary information for the set-up of an appropriate filter.

The MPE can intercept and analyze packets inside the core network, or intercept and analyze the same outside the core network, in particular between the RAN and the core network.

Alternatively or in addition the MPE can also analyze packets from the gateway to the external IP network.

In order to set up a filter, the MPE has to compare the retrieved information from the packets with an applicable policy to that WTRU which has requested the media communication. The policy is contained in a database which can be interrogated, for example by the MPE, as detailed below.

The mobile policy engine MPE 500 may be implemented by dedicated hardware and/or comprise software functions executed by a processor. Moreover, the MPE can be part of nodes already existing in the core network 106.

Network 100" further includes a User Policy Database 501. The UPD 501 comprises data describing user access and service profiles that need to be enforced. Each entry of the database is identified by an user identity. As known in the art, each WTRU 101 or user is identified by a "user identifier" 302 such an identifier can be for example an International Mobile Subscriber Identity (IMSI) and/or a given terminal serial number such as an International Mobile Equipment Identifier (IMEI) of the WTRU. Any other user identifier can be used, as long as it uniquely identifies the WTRU 101.

In addition to the user identity (e.g., an entry connected to the user identifier), the User Policy Database 501 may contain one or more of the data illustrated with reference to FIG. 6, collected in a record 301:

User identifier 302;

Priority Level 303: a number corresponding to the relative priority assigned to the WTRU 101 corresponding to the user identifier 302. As an example, this could be a number on a scale 10 (highest priority) to 1 (lowest priority);

List of allowed VoIP servers for dedicated bearer 304: one or more Internet Protocol (IP) addresses or Fully Qualified Domain Names (FQDN) identifying the allowed VoIP servers for dedicated bearers. When the user establishes a VoIP call with one of these servers then the MPE 210 will act to assign a high quality dedicated bearer to the call;

List of allowed video servers for dedicated bearer 305: one or more Internet Protocol (IP) addresses or Fully Qualified Domain Names (FQDN) identifying the allowed video servers for dedicated bearers. When the user establishes a video streaming with one of these servers then the MPE 210 will act to assign a high quality dedicated bearer to the connection;

List of allowed servers for dedicated bearer using a given application 306: same as above but in relation to servers for any other type of application e.g. financial transactions, file downloads. One or more copies of field 306 may exist within a record of the UPD 301, each one identifying a different application;

Disallow incoming or outgoing VoIP calls 307-308;

List of disallowed VoIP call numbers 309: The list of numbers (and/or user identifiers) that the WTRU must be blocked from calling (e.g. international numbers);

Maximum Uplink (UL) throughput 310: maximum uplink bitrate that the WTRU is allowed to utilize;

Maximum Downlink (DL) throughput 311: maximum downlink bitrate that the WTRU is allowed to utilize;

List of disallowed locations for network access 312: a list of locations from which the WTRU is disallowed to connect to the network;

List of disallowed locations for VoIP calling 313: a list of locations from which the WTRU is disallowed to make VoIP calls;

List of disallowed locations for a given Application 314: a list of locations from which the WTRU is disallowed to establish connections and/or utilize a given application. One or more copies of field 314 may exist within a record of the UPD 301, each one identifying a different application;

Maximum number of VoIP calls 315: the maximum number of contemporary voice calls allowed for the WTRU;

Maximum number of communications for a given application 316: the maximum number of contemporary communications for the WTRU in relation to a given application;

List of disallowed IP addresses and port 317; the IP addresses and ports to which the WTRU cannot communicate.

The location above may include a base station identifier, 3GPP Service Area Identifier (SAI), cell identifier and/or other positioning information such as GPS coordinates.

Figure 6:
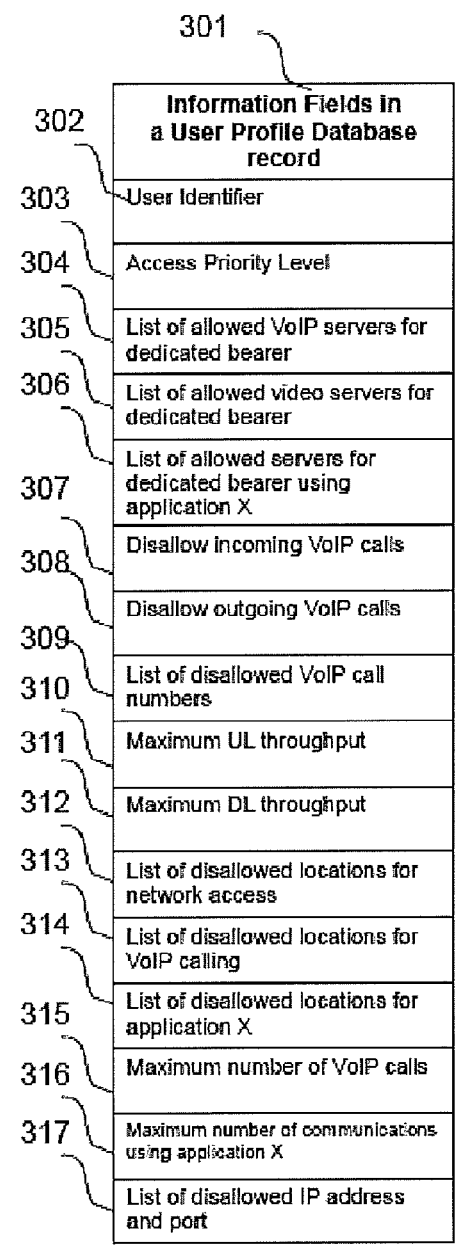
FIG. 6 is an entry of the database of the invention.

A UPD 501 includes one or more records 301 as illustrated in FIG. 6, in particular preferably one record for each user identifier 302.

UPD information fields 306, 314 and/or 316 may be replicated multiple times in a single UPD record 301 to cater for the number of applications that need to be profiled for the WTRU.

The fields of the UPD 501 relating to a given WTRU identified by the user identifier 302 that connects to the network 100" are retrieved optionally by the MPE either during the attachment procedure of the WTRU, or during the establishment of the default bearer between the WTRU and the gateway to the external IP network.

Thus, given the user identifier of a given WTRU connecting to the network 100", the MPE 500 first of all detects its user identifier analyzing the first packets exchanged with the core network (this packet can be intercepted in or outside the core network). From the user identifier, the MPE reads the database 501, in order to understand the type of policy which is applicable to such a WTRU.

Further, the network 100" includes a Policy Control Unit PCU 502 which comprises an interface, including but not limited to a Graphical User Interface 503 and/or Application Programming Interface 504, that allow a network manager to:
  create and/or edit and/or delete policies in the UPD;
  create and/or edit and/or delete user groups;
  create and/or edit and/or delete definitions of geographical locations;
  create and/or edit and/or delete IP addresses and/or subnetworks (e.g. corresponding to enterprise private network subnet, engineering department private subnet, file sharing site/s etc.);
  select an Access Priority Mode algorithm for access control what utilizes Access Priority Levels;
  assign to the user a maximum amount of usable traffic per month (expressed in MegaBytes, GigaBytes or other);
  etc.

The MPE 500 is connected to the PCU 502 and in addition can read all entries of the UPD 501.

The PCU (or the MPE, as already said) can thus read the fields of the UPD 501 relating to a given WTRU identified by the user identifier 302 that connects to the network 100". This retrieval is made either during the attachment procedure of the WTRU, or during the establishment of the default bearer between the WTRU and the gateway to the external IP network.

The MPE, UPD and/or PCU may all be implemented as part of conventional Mobile Core Network nodes (LTE Enhanced Packet Core, UMTS Packet Core etc.). The UPD may also be implemented as part of a conventional Home Location Register and/or Home Subscriber System (HSS). For example, in the example of FIG. 4, a conventional user WTRU 101 connects to a conventional Radio Access Network 104. The Radio Access Network 104 comprises the radio base station element of the network. This includes the UMTS Radio Access Network (UTRAN) or the LTE Enhanced UMTS Radio Access Network (E-UTRAN), and others. The Radio Access Network 104 is connected to a Mobile Core Network 06. The Mobile Core Network 106 is subdivided into a Mobile Core Traffic function 204 that handles the traffic routing operations and a Mobile Core Signalling function 205 that handles the processing of signalling messages. As an example, in LTE networks the MME corresponds to the Mobile Core Signalling function 205 and the P-GW and S-GW correspond to the Mobile Core Traffic function 204.

The MPE 500 is connected to the Mobile Core Signalling function 205, to the Mobile Core Traffic function 204, to the Radio Access Network 104, to the Policy Control Unit (PCU) 502 and to the Internet, IMS, other applications and networks 108,110,112,142.

MPE and PCU can be located inside the core network (embodiment of FIG. 4) or outside the same (embodiment of FIGS. 3 and 3A).

The MPE 500 is configured to process signalling and traffic between the Radio Access Network 104 and the Mobile Core Network 106. The MPE 500 is configured to process signalling and traffic between the Mobile Core Network 106 and the external IP network such as the Internet, other applications and networks.

The PCU 502 is configured to process radio signalling. Therefore, the MPE 500 reads and analyzes all packets related to signalling and traffic flow, while the PCU reads and analyzes all packets of the radio signalling. The PCU 502 reads the user policies in the UPD 501 and any changes to them. It communicates the policy records 301 containing the corresponding user identifiers 302 to the MPE 500.

MPE and PCU can be implemented in the same node, i.e., MPE and PCU can be the same unit. However, in case in different part of the core network 106 different filters have to be established, then preferably several MPE are located and a single PCU is used as a "coordinator" of all MPE, deciding which filters have to be implemented and in which node(s) depending on the read process signals.

As shown in FIG. 3A, MPE 500 and PCU 502 can also be part of the base station 114. Also in this case, MPE and PCU may coincide in a single unit.

Figure 5:
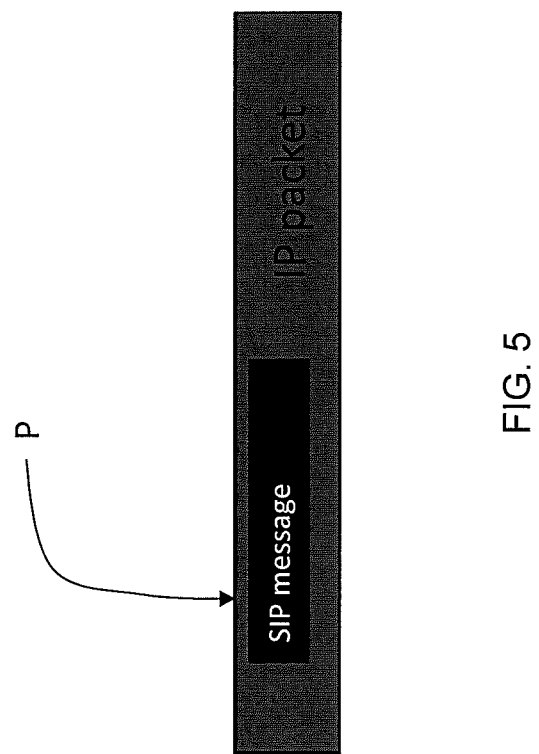
FIG. 5 is a schematic representation of an IP packet containing a VoIP (SIP) signaling message.

The analysis of the packets by the MPE 500 and/or by the PCU 502 has to be in depth in order to apply the policy contained in the UPD 501. With reference to FIG. 5, this can be explained with an example. In order to apply the policy, for each media session which is established by the WTRU, the MPE has to know at least one or more of the following data:
  IP address associated to the WTRU;
  the location of the WTRU;
  the IP address and TCP/UDP port of the server/additional WTRU to which the WTRU is allowed to communicate with (e.g. to establish a media session or to send media traffic) e.g. 304 List of Allowed VoIP servers for dedicated bearer, 305, 306;
  the type of media session established;
  the IP address and TCP/UDP port of the server/additional WTRU to which the WTRU is not allowed to communicate with (includes the options "All disallowed unless allowed above", "None disallowed") 317.

Alternatively, the location of the WTRU is determined by the PCU: in case the PCU reads the signalling and the entries database UPD, the MPE does not need to have the knowledge of WTRU's location because filters are implemented by the PCU. For example, assuming PCU has acquired knowledge of WTRU's location, PCU informs the MPE when it has to block all communications from/to the WTRU because the WTRU is in a location in which communications are disabled according to the policy; and, on the contrary, it informs the MPU when it has to allow such communications again, because the WTRU has exited such location. In this scenario, the MPE does not have to know the location of the WTRU.

Figure 12:
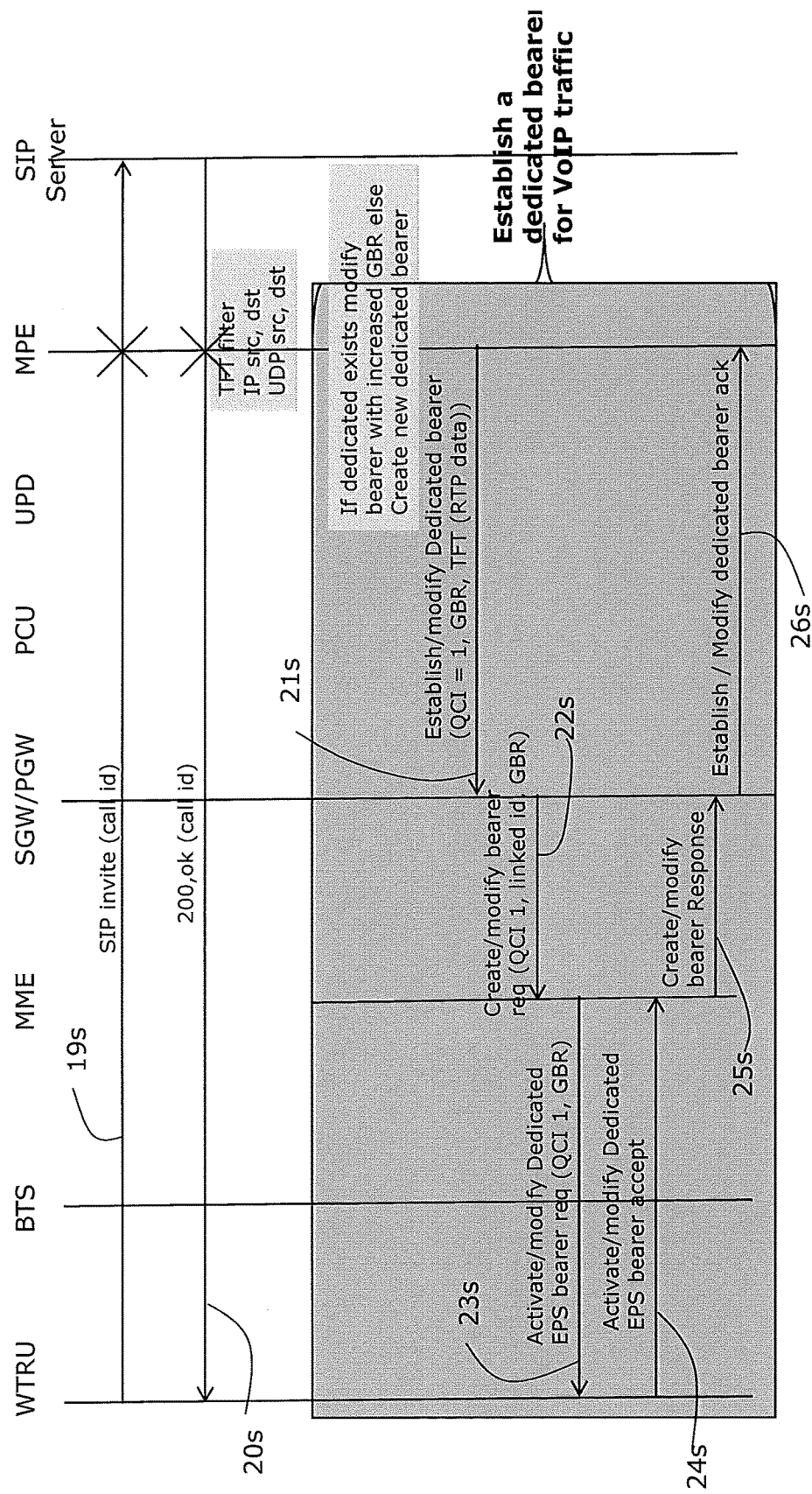
FIG. 12 is a diagram of an embodiment of the application of a further step of the method of the invention.

If for example the WTRU 101 requests a SIP session using a SIP server or proxy, the packet which is sent by the WTRU 101 and from the RAN is flowing within the core network is such as in FIG. 5. FIG. 12 shows the flow of such a packet within the core network. The IP packet containing the SIP message is an IP packet which is characterized by a 5-tuple including source IP address, destination IP address, source port, destination port, protocol number. If the MPE 500 detects only this information contained in the IP packet, the MPE 500 understands that SIP messages are being utilized to establish a communication between two endpoints, but the MPE 500 cannot determine which two endpoints intend to establish a communication and what application is being transported by the IP packet. This means that the above info is only sufficient to determine that a WRTU is attempting to establish a communication using SIP. It is not sufficient to determine what voice/video or other application is being established or the endpoints that will be involved in such communication once it is established (which do not always coincide with the original destination and origin IP addresses contained in the IP packet).

SIP message is an "application" message carried by the IP packet.

It may contain information including:
success or error code,
caller identity (or number),
callee identity (or number),
type of call (voice, video) or message,
IP address and ports which the caller and callee will use to send the actual media (voice, video, message etc.)

Only if the MPE 500 reads also this info contained in the SIP message, in addition to the info carried by the IP packet, it can determine which type of application or media session is established and the endpoints that will be involved in the communication once it is established. The MPE implements one or more filters, as better detailed below, which are received from the PCU (or auto-generated). Therefore the amount and type of info the MPE has to retrieve from the packets in order to implement the filters indeed depends on the filters itself. However, in general the minimum information is relative to the endpoints involved in the media session and the type of media session.

The PCU 502 delivers the information contained in the UPD 501 to the MPE 500, either following a request by the MPE 500 or automatically. For example, the PCU 502 may send policy data to the MPE 500 for a given user every time it detects that the WTRU has connected to the network. The MPE 500 may also request all policy data from the PCU 502 at start-up time and/or at regular intervals, for example when the MPU is the only node without the PCU. The PCU 502 may inform the MPE 500 of any changes in the data stored in the UPD 501.

Based on these policies, the MPE 500 establishes a filter for the traffic and signalling to detect events related to the user identifiers 302 that match the policies which require an action to be taken, preferably on the basis of the instructions received by the PCU.

In other words, given the user identifier read from the packets of the WTRU for which a default bearer has been established and in which packets relative to a media session are travelling, the MPE further intercepts packets belonging to the media session and compares the information retrieved with the policy associated to the WTRU obtained from the UPD 501. In this way the MPE can create an appropriate filter.

Such events may include as an example:
A mobile user connecting to the network (no location area);
A mobile user connecting to the network (from a specific location area comprising one or more of a base station cell identifier, 3GPP Service Area Identifier, GPS coordinates etc.);
A mobile user dialling or receiving a circuit voice call to/from a given number;
A mobile user dialling or receiving a VoIP call to/from a given number or user identifier;
A mobile user in a given location dialling or receiving a circuit voice call;
A mobile user in a given location dialling or receiving a VoIP call; A mobile user completing a successful VoIP call establishment with a given VoIP server, calling user IP address, called user IP address, receive and transmit transport (e.g. User Datagram Protocol) port numbers etc;
A mobile user connecting to a given server for a given application (e.g. video streaming from Youtube server 1 in Egypt).

When the MPE 500 detects than an event for a given user identifier 302 has occurred, that matches the information in the UPD 501, then the MPE 500 will take the actions specified by the policy for such specific user identifier 302, such as:
No action which means that the MPE 500 does not interfere with any communications from/to the WTRU 101;
Reject a WTRU's 101 request to connect to the network 106 based on the Priority level 303 and the outcome of a priority algorithm (see example algorithms in FIGS. 8 and 9);
Reject WTRU's 101 request to connect to the network from a given location because the a disallowed location (see record item 312 in FIG. 6);
Reject a WTRU 101 dialling or receiving a VoIP call to/from a given number or user identifier;
Reject a WTRU 101 dialling or receiving a circuit voice call from a given location;
Reject a WTRU dialling or receiving a VoIP call from a given location;
Communicate with the Mobile Core network 106 and/or Radio Access Network 104 to create or tear down a dedicated bearer with guaranteed Quality of Service (QoS) for a VoIP call;
Communicate with the Mobile Core network 106 and/or Radio Access Network 104 to create or tear down a dedicated bearer with guaranteed Quality of Service (QoS) for the given application (e.g. video streaming or other).

All these actions are specified by the UPD 501 for the user identifier 302 associated to the specific WTRU 101.

Thus PCU 502 and MPE 500 are so designed to check and analyze all packets of either signal or data flow within the core network 106. From the analysis of the packets, the user identifier 302 of the WTRU 101 which is attached to the network 100" is obtained. The UPD 501 is interrogated in order to obtain all policy rules 301 which are associated to such a identifier 302 or alternatively all entries of the UPD 501 are available because they had been previously downloaded. The MPE 500 thus creates a filter which applies these policies.

In case the policy so allows, for a given WTRU for which a media connection has been established between the WTRU and the receiver equipment which can be either another WTRU or a server, the MPE forces the core network or the gateway or the RAN, or a combination thereof to create a dedicated bearer, instead of the standard default bearer, for the already established media communication.

In other words, the MPE, depending on what the policy says about a given WTRU, forces the network to make the packet flow in a bearer having a better QoS instead of the default one already assigned to the WTRU.

A dedicated bearer is a bearer to carry a specific data flow, identified by the TFT (Traffic Flow Template), with a given QoS. A bearer is considered to be an information transmission context or path of defined characteristics, e.g. capacity, delay, priority, and/or bit error rate. It is possible to establish a number of bearers between a gateway of a mobile communication network and a WTRU, e.g., a mobile phone or other type of mobile terminal. A bearer may carry downlink (DL) data traffic in a direction from the network to the user equipment, and may carry data traffic in an uplink (UL) direction from the user equipment to the network. In the gateway and in the UE the data traffic, which includes a plurality of IP data packets (IP: "Internet Protocol", which may be the IP Version 4, also referred to as IPv4, or the IP Version 6, also referred to as IPv6) can be filtered, e.g., using IP 5-tuple packet filters, thereby directing the IP data packets to a desired bearer.

Figure 7:
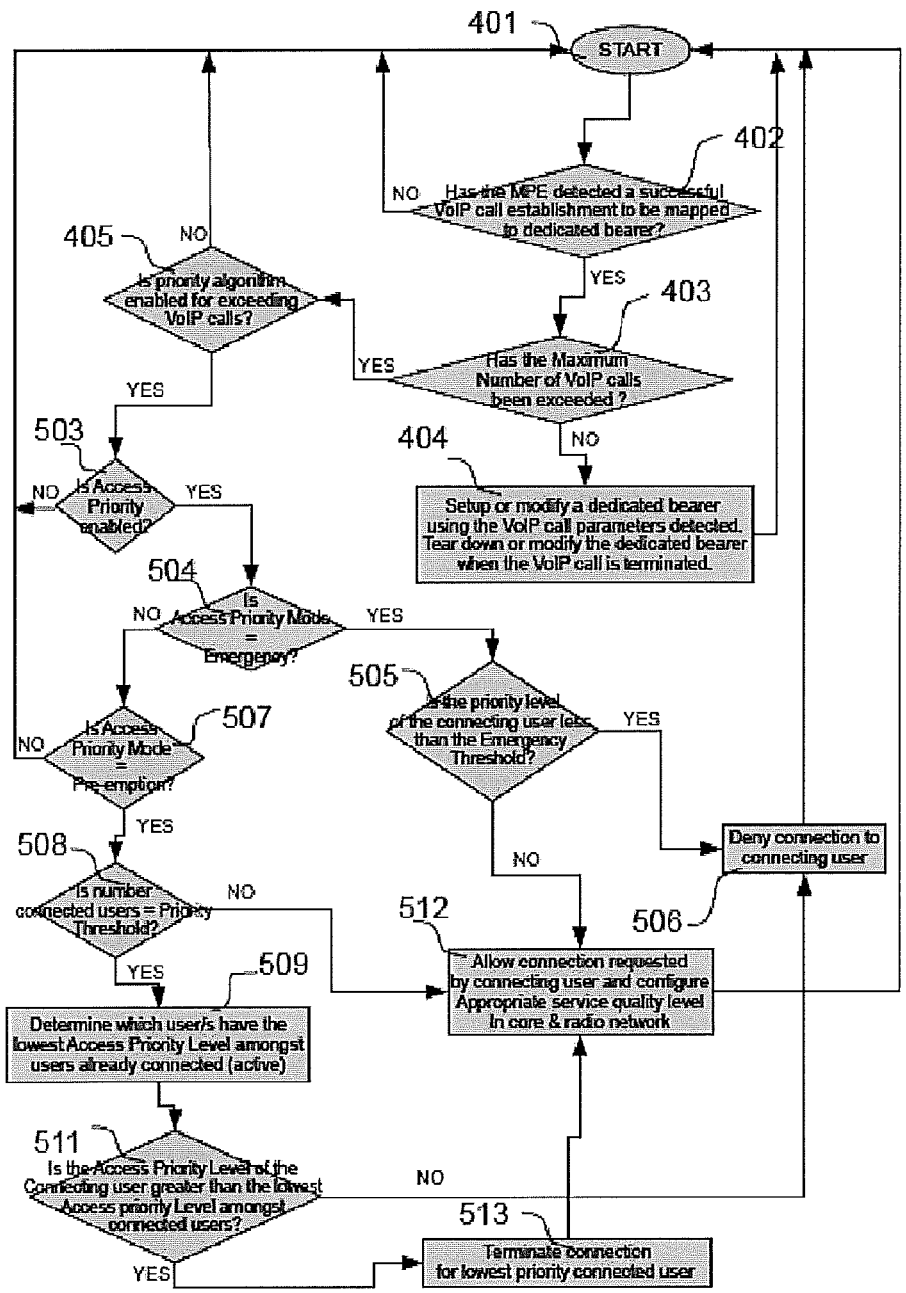
FIG. 7 is a flow diagram of a phase of the method of the invention.

Referring to FIG. 7, a flow chart is provided describing the operation of the MPE 500 for assigning a dedicated bearer with guaranteed Quality of Service (QoS) for a VoIP call requested by a WTRU. The same flow chart of FIG. 7 can be applied to any other media session, not only VoIP sessions. The WTRU has previously successfully attached to the core network, a default bearer has been created and a VoIP call, i.e., a media communication session, has been established using the default bearer. In 402, the MPE 500 filters messages to detect a successful VoIP call establishment event that:
  was based on VoIP (SIP) signalling with a VoIP server present in the "List of allowed VoIP servers for dedicated bearers" 304 and;
  did not violate policies "Disallow incoming calls" 307 or "Disallow outgoing calls" 308 and;
  did not involve the user calling a number or a user identifier that is part of the "List of disallowed VoIP call numbers" 309.

In other words, all requirements of the policy applicable to the WTRU 101 which has initiated the media communication session, WTRU identified by its identifier 302, and written in the UPD 501, have to be satisfied.

A successful VoIP call establishment is one where the SIP procedure has been completed successfully, the call has been answered and voice traffic is to begin. When such a successful VoIP call establishment is detected, the MPE 500 saves the parameters of the call included in the SIP messages such as caller IP address, callee IP address, caller source and destination port, callee source and destination port. The MPE 500 also increments a counter used to track the number of contemporary VoIP calls. Processing then proceeds onto step 403.

In 403 the MPE 500 checks the UPD 501 information element "Maximum number of VoIP calls" 315 and the counter above to determine whether the successful call that has been detected exceeds the maximum number of contemporary voice calls allowed. If the maximum number is exceeded then from 402 the process continues in step 405 described below. If the maximum number is not exceeded, then processing will continue with step 404.

In step 404, the MPE 500 communicates with the Radio Access Network 104 and/or Mobile Core network 106 to establish a dedicated bearer for the VoIP call by utilizing the saved parameters as the dedicated bearer TFT (Traffic Flow Template) parameters specified in the 3GPP standard. The MPE 500 also continues to monitor the signalling messages of the successful VoIP call. When the call is deemed to have terminated, the MPE 500 communicates with the Radio Access Network 104 and/or Mobile Core network 106 to tear down the above dedicated bearer. The MPE 500 also decrements the counter used to track the number of contemporary VoIP calls.

The same flowchart applies in the same way to any application other than VoIP using for example the User Profile Database 501 information elements "List of allowed video servers for dedicated bearers" 305 and "List of allowed servers for dedicated bearer using application X" 306. In this case, the MPE 500 filters packets to detect the successful establishment of a connection to the given application server. It saves the parameters of the connection, such as source or client IP address and port, destination or server IP address and port, and utilizes them as the dedicated bearer TFT to establish a dedicated bearer. Using the same principles above, dedicated bearers will be established only for a number of contemporary communications up to the number in UPD information element "Maximum number of communications using application X" 316.

More in detail, a check is made in 503 to determine whether Access Priority is enabled. If Access Priority is enabled then a check is made in 504 and 507 to determine whether the Access Priority Mode equals "Emergency" or "Pre-emption". If Access Priority mode=emergency, processing occurs in 505 to determine if the Connecting User has an Access Priority Level 303 (that can be read from the UPD 501) that is less than the Emergency Threshold. If it is less than the Emergency Threshold, then the Connecting User is denied access in 506, otherwise it is allowed access in 512. The MPE 500 may deny access in 506 by blocking the relevant signalling messages related to the user requesting a connection, such that they will not be processed by the Mobile Core Network 106, and responding with signalling containing the appropriate reject cause, in case the priority level of the WTRU is below the emergency threshold. By choosing the appropriate reject cause the MPE 500 is able to cause the user's mobile terminal not to reattempt a connection for a long time. The MPE 500 may allow access in 512 by letting the relevant signalling message through to the Mobile Core Network 106 for normal processing. The MPE 500 may also achieve the same results by communication with the Mobile Core Network 106 instructing it to deny access to the Connecting User instead of blocking messages.

Instead, if the Access Priority Mode equals "Pre-emption" in 507, another check is made in 508 to determine whether the current total number of users connected to the network has reached the Priority Threshold. If the Priority Threshold has not been reached then in 512 the Connecting User is allowed access to the network. The MPE 500 may allow access in 512 by letting the relevant signalling message through to the Mobile Core Network 106 for normal processing.

Instead, if it is determined in 508 that the current total number of users connected to the network has reached the Priority Threshold, in 509 the list of currently connected users is parsed to determine the user or users having the lowest Access Priority Level 303 (read from the UPD 501).

Using this information in 511 a check is made to determine if the Access Priority Level 303 of the Connecting User is greater than the lowest Access Priority Level amongst the users already connected that had been determined in 509. In the latter case, i.e. if the access priority is greater, processing proceeds to 513 where the connection of the user (or one of the users) having the lowest Access Priority Level is terminated to make space for the Connecting User. Subsequently 512 is executed as above. Instead if in 511 the Access Priority Level 303 of the Connecting User is not greater than the lowest Access Priority Level amongst the users already connected then processing proceeds to 506 as described above where the Connecting User is denied the connection. If the user has the access denied, the process restarts from the beginning 401.

Figure 8:
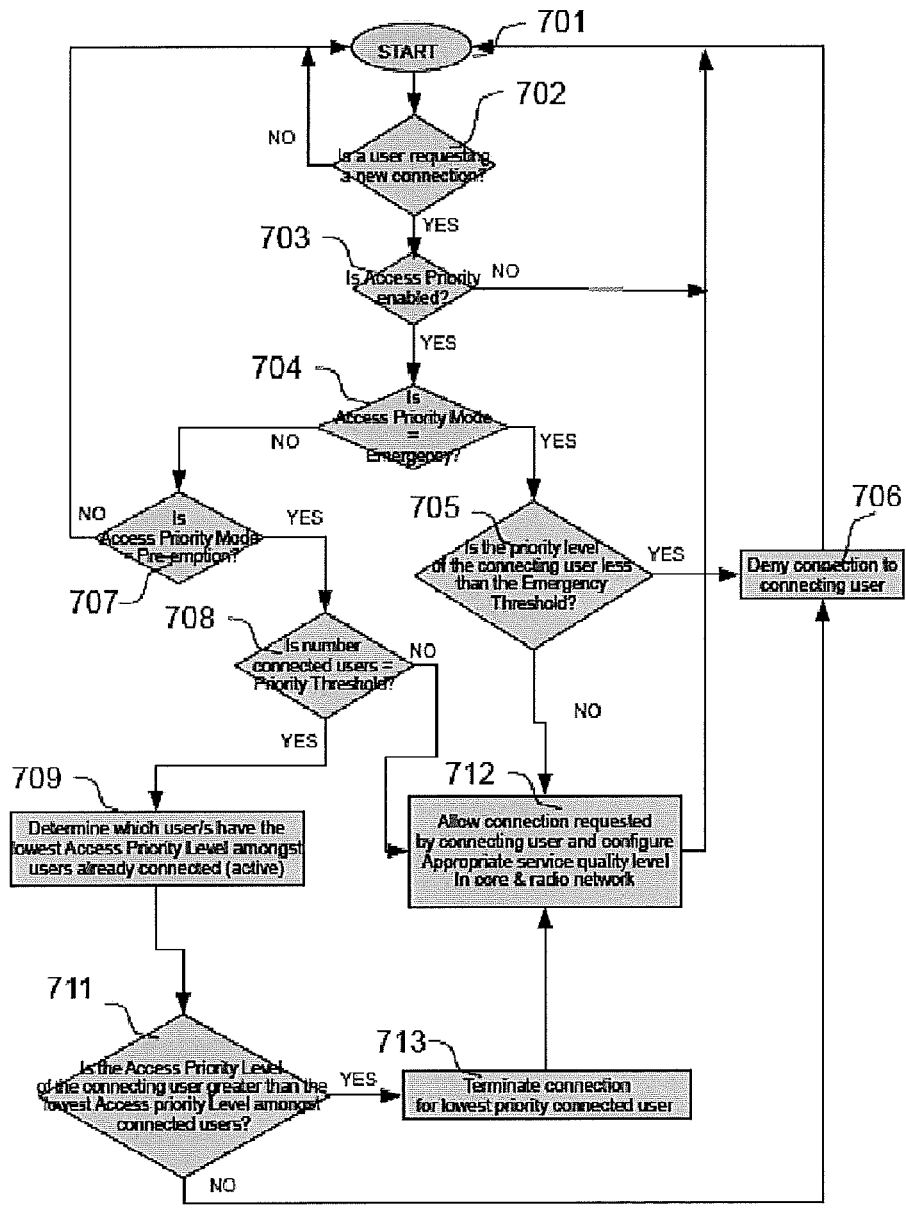
FIG. 8 is a flow diagram of a different phase of the method of the invention.

Referring to FIG. 8, a flow chart is provided describing the operation of the PCU 502 and/or MPE 500 for implementing an example of a priority algorithm that utilizes the Priority Level information 303 in the UPD 501 in order to guarantee network access to high priority users in mission-critical environments.

The algorithm starts at 701. If a WTRU is requesting a new connection (named "Connecting User") as determined in 702, a check is made in 703 to determine whether Access Priority is enabled. If Access Priority is enabled then a check is made in 704 and 707 to determine whether the Access Priority Mode equals "Emergency" or "Pre-emption". In the former case, processing occurs in 705 to determine if the Connecting User has an Access Priority Level 303 (that can be read from the UPD 501) that is less than the Emergency Threshold. If it is less than the Emergency Threshold, then the Connecting User is denied access in 706, otherwise it is allowed access in 712. The PCU 502 and/or MPE 500 may deny access in 706 by blocking the relevant signalling messages related to the user requesting a connection, such that they will not be processed by the Mobile Core Network 106, and responding with signalling containing the appropriate reject cause. By choosing the appropriate reject cause the PCU 502 and/or MPE 500 is able to cause the user's mobile terminal not to reattempt a connection for a long time. The PCU 502 and/or MPE 500 may allow access in 712 by letting the relevant signalling message through to the Mobile Core Network 106 for normal processing. The PCU 502 and/or MPE 500 may also achieve the same results by communication with the Mobile Core Network 106 instructing it to deny access to the Connecting User instead of blocking messages.

Instead, if the Access Priority Mode equals "Pre-emption" in 707, another check is made in 708 to determine whether the current total number of users connected to the network has reached the Priority Threshold. If the Priority Threshold has not been reached then in 712 the Connecting User is allowed access to the network. The PCU 502 and/or MPE 500 may allow access in 712 by letting the relevant signalling message through to the Mobile Core Network 106 for normal processing.

Instead, if it is determined in 708 that the current total number of users connected to the network has reached the Priority Threshold, in 709 the list of currently connected users is parsed to determine the user or users having the lowest Access Priority Level 303 (read from the UPD 501). Using this information in 711 a check is made to determine if the Access Priority Level 303 of the Connecting User is greater than the lowest Access Priority Level amongst the users already connected that had been determined in 709. In the latter case, processing proceeds to 713 where the connection of the user (or one of the users) having the lowest Access Priority Level is terminated to make space for the Connecting User. Subsequently 712 is executed as above. Instead if in 711 the Access Priority Level 303 of the Connecting User is not greater than the lowest Access Priority Level amongst the users already connected then processing proceeds to 706 to deny access to the Connecting User as described above.

Figure 9:
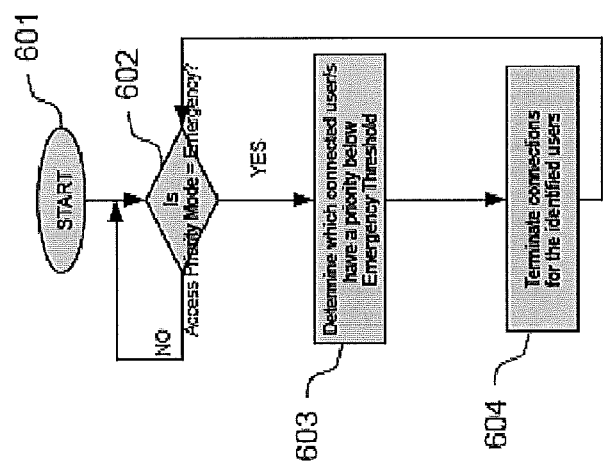
FIG. 9 is a flow diagram of a different phase of the method of the invention.

Referring to FIG. 9, a flow chart is provided describing the operation of the MPE 500 and/or PCU 502 for implementing an example of a priority algorithm that utilizes the Priority Level information 303 in the UPD 501 in order to guarantee network access to high priority users in mission-critical environments.

The algorithm starts at 601. In 602 if the Access Priority Mode is determined to be equal to "Emergency" then in 603 the list of users connected to the network is checked to determine whether any of those users have a Access Priority Level 303 (that can be read from the UPD 501) that is less than the Emergency Threshold. If any such users are found then they are disconnected from the network in 604. The MPE 500 and/or PCU 502 may disconnect users by generating the relevant signalling messages that cause the user's mobile terminal to end the connection. These signalling messages may be sent by the MPE 500 and/or PCU 502 directly to the Radio Access Network 104 or the MPE 500 and/or PCU 502 may communicate with the Mobile Core Network 106 in order to instruct it to terminate the connection/s and send the required signalling messages.

In FIGS. 10-14, two preferred embodiments of two different media communication session establishments according to the disclosed method are detailed. The initial procedure(s), such as the search and an RRC attach procedure between the user equipment WTRU and the base station is not explained and realized according to the standard of the network involved.

The various elements of the network 100" with reference to FIGS. 10-14 are those already described with reference to FIGS. 3 and 4.

Although the node names of FIGS. 10-14 are relative to an LTE (EUTRAN) network, these names are not limiting and the traffic flow can be the same in a different network using different protocols. Preferred networks are UMTS, LTE and LTE-Advanced.

Figure 10:
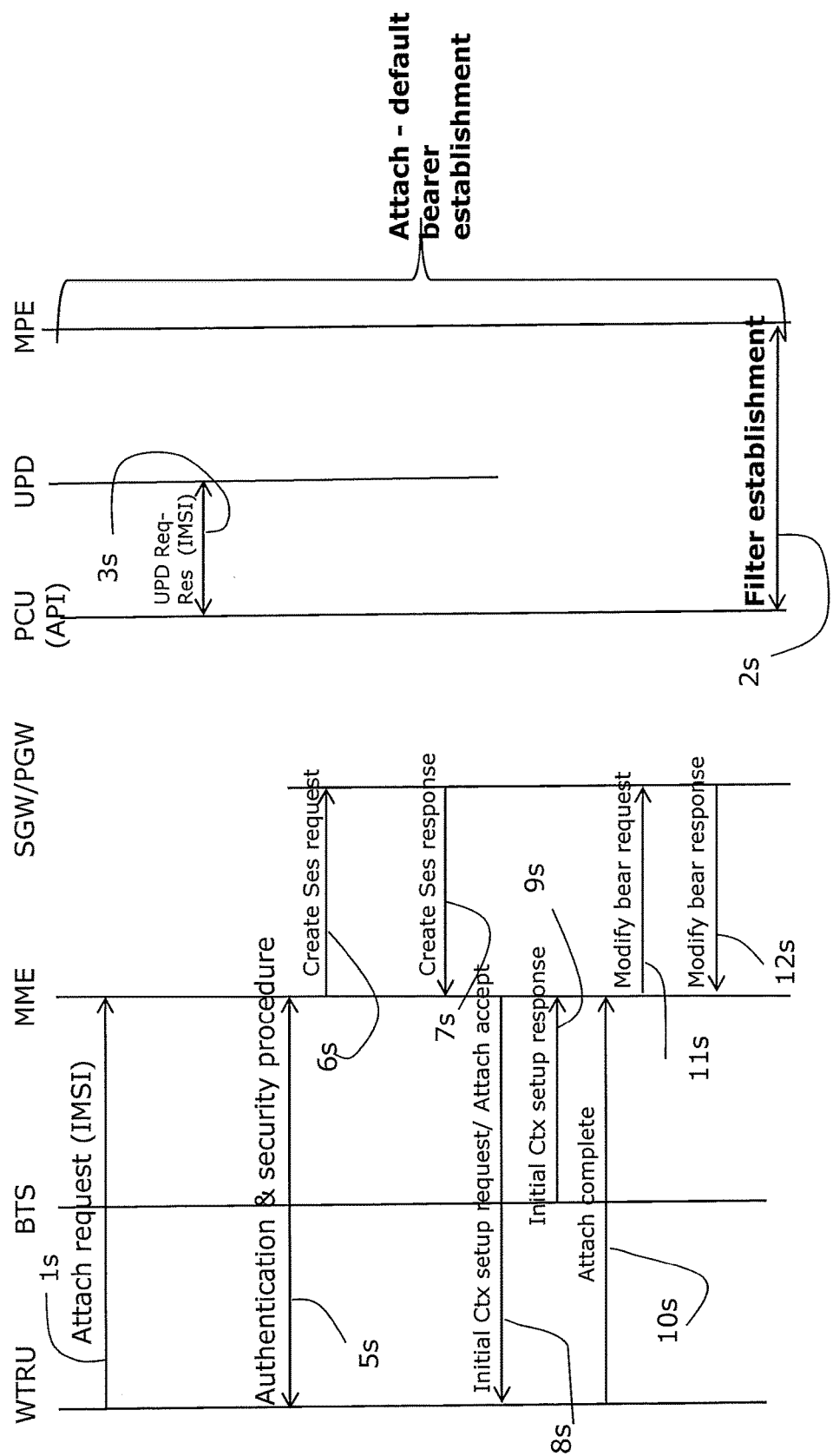
FIG. 10 is a diagram of an embodiment of the application of a step of the method of the invention.

With initial reference to FIG. 10, the first phase is an attach procedure of the WTRU with the network, procedure that includes also an authentication procedure based on the user identifier, in this case the IMSI of the WTRU (step 1 $s$). In an embodiment, the IMSI may also not be available in this phase and can be requested by the MME after the WRTU attachment. As already mentioned, this initial procedure is not relevant for the invention and depends on the network and on the protocol.

As an example of an attach step 1 $s$, in EUTRAN, the WTRU sends out a RRC_CONNECTION_REQUEST to the base station (indicated with BTS in FIG. 10). If the base station BTS accepts the request, it sends a RRC_CONNECTION_ACCEPT to WTRU. Upon reception of this accept message, the RRC connection is established. To complete the procedure, the WTRU sends RRC_CONNECTION_COMPLETE message along with a NAS message. For EUTRAN, the NAS message is a PDN Connectivity Request, which is a message in which the WTRU informs the network that it needs a bearer to transmit data. Upon reception of RRC_CONNECTION_COMPLETE message along with NAS message, the base station extracts the NAS message, and places it in a S1AP message (Initial WTRU Message) and passes it to MME. This step 1 $s$ is indicated with "Attach request" 1s in FIG. 10. In addition, the information relative to the IMSI of the WTRU is also send via this message to the MME.

The important aspect is that in the attach procedure 1s, or after the same, the user identifier (IMSI) of the WTRU is sent to the core network (e.g. to the MME).

The PCU, according to disclosed embodiments, can intercept and analyze all messages within the core network, i.e. all messages which are sent and received from/to the RAN (in this case the BTS) and from/to the gateway (in FIG. 10 indicated as PGW/SGW) to the external IP network. Preferably, the PCU is responsible for checking and analyzing all messages relative to the signaling (where signaling is meant in the strict sense, i.e. radio signaling). Therefore, it can analyze the messages sent from the base station BTS to the MME during the attach step 1s and thus detects the IMSI and, optionally but preferably, also the location of the WTRU. As a consequence, a query is made in the User Policy Database UPD whether the IMSI of the WTRU requiring an attach belongs to the listed IMSI in the database UPD, step 3s. In the affirmative case, a download may take place from the UPD to the MPE (via PCU or directly) of all information contained in the UPD relative to such specific WTRU having the given IMSI. Alternatively the UPD does not need to be queried or downloaded because all entries of the UPD 501 are available in the PCU and/or MPE since they had been previously downloaded.

At this moment, depending on the very few information available, there can be already optionally an action of the PCU of the invention. For example, in case the IMSI of the WTRU according to the information retrieved from the UPD is not allowed to connect to the network from the specific location in which it is located, the MPE forces the MME and/or the BTS not to accept the attachment, e.g. to tear down the same. Alternatively or in addition, the attachment is also torn down in case there is a too high traffic (for example above a given threshold) within the network and the IMSI of the WTRU does not have a priority high enough to tear down the connection of other WTRUs.

These optional steps are not shown in FIG. 10.

In case the WTRU is allowed to communicate with the network, the flow of messages continues.

An authentication and security procedures has taken place 5s.

In the following phase, according to the standard, a default bearer is created for the WTRU (steps 7s-12s). The details of this phase are not relevant for the invention; the only relevant part is that from this default bearer establishment procedure, the PCU is capable of retrieving the IP address of the WTRU.

Following the initial attachment request, a session request message (step 6s) is sent by the MME to the gateway SGW/PGW to the external IP network and a response is obtained from the same (step 7s).

For example, MME reads the NAS message sent during the attach phase 1 s and understands that WTRU needs a default bearer and an IP address. MME creates a GTP message Create Session Request—6s—and forwards it to SGW. At this point MME assigns an EPS bearer ID to the bearer. This bearer is the default bearer.

As an example, considering GTPv2 based S11 interface, the MME sends the GTP Create session request to the S-GW that includes FTEID (Fully qualified tunnel end point identifier) for the user plane, EBI, QoS requested, IP address of WRTU (set to 0 if dynamic IP address assignment is used).

Once the MME receives the create session response from the S/P-GW, the MME receives the IP address to be sent to the WTRU, FTEID for the S1-U user plane entity of the S-GW, step 7s.

At this point, the PCU knows the IP address of the WRTU due to the fact that it detects and analyzes all messages within the core network.

Thus the setup message to create the default bearer is sent by the MME to the WTRU, step 8s. After the response, 9s, the WTRU can transmit data, being the attach complete 10s.

In a more detailed example of these steps 8s and 9s, MME receives the session response of phase 7s. It takes the SGW TEID, EBI and QoS values and places them in the Activate Bearer Context Request NAS message and sends it to the base station in S1AP ERAB setup request message. At this point EPS bearer is established and a Radio Bearer has to be established so that the WTRU can start transmitting the data.

ERAB (EUTRAN Radio Access Bearers) Setup Request just does the same. The base station receives the S1AP message, pulls out the NAS message, places it in a RRC CONFIGURATION REQUEST and sends it to WTRU. Also the base station BTS reads the QoS values and SGW FTEID for uplink data transmission (step 8s).

WTRU responds with RRC_CONFIGURATION_COMPLETE message. It also starts processing the NAS message. Once the NAS layer approves the default bearer establishment, the same is informed to the base station in a RRC UL Info Transfer message. NAS message Activate Default Bearer Context Request accept message is attached to the RRC message. At this point the WTRU knows the Bearer ID, an IP address and corresponding QoS values.

The base station BTS informs that WTRU has accepted the default bearer from MME in a S1-AP UL NAS Transport Message, and the NAS message is attached to it. Also the base station indicates its FTEID for user plane communication to MME (step 9s).

MME preferably indicates the base station user plane info to the gateway SGW. This is done in a GTP message Modify bearer request 11s. SGW "learns" the base station user plane information from it. After this user plane data exchange 12s, the data shall flow on the just established default bearer.

The assigned default bearer preferably remains as long as WTRU is attached. Default bearer is a best effort service. Each default bearer comes with an IP address. WTRU can have additional default bearers as well, therefore the steps above described can be repeated several times for each bearer. Each default bearer has a separate IP address and the PCU "learns" each of the separate IP address as seen above. Preferably, QCI 5 to 9 (Non-GBR) can be assigned to default bearer.

The QCI is a scalar denoting a set of transport characteristics (bearer with/without guaranteed bit rate, priority, packet delay budget, packet error loss rate) and used to infer nodes specific parameters that control packet forwarding treatment (e.g., scheduling weights, admission thresholds, queue management thresholds, link-layer protocol configuration, etc.).

Each packet flow is mapped to a single QCI value according to the level of service required by the application. The usage of the QCI avoids the transmission of a full set of QoS-related parameters over the network interfaces and reduces the complexity of QoS negotiation.

Preferably, the established bearer is a EPS bearer, between the base station and the gateway SGW/PGW to the external IP network.

At the end of the creation of the default bearer, the PCU has learned, from an analysis of the exchanged messages within the core network, the IMSI and IP of the WTRU. Moreover, preferably it also knows the location of the WTRU (which can change with time, therefore the policy enforcement applicable to the WTRU, which can depend on the location of the latter, can also change with time).

It is to be understood that although the above has been described with reference to a EUTRAN network, it can be applied to any network. The important aspect is that in the network in issue there should be a procedure in which the WTRU can attach to the network and then a bearer can be established. According to the disclosed embodiments, the network includes a Mobile Policy Engine and/or Policy Control Unit which can make an analysis of all packets within the core network so that a filter can be imposed as soon as the bearer is established.

According to the disclosed embodiments, following the successful attach procedure and default bearer establishment, a packet filter is configured as per step 2s described in the following.

The download of all the policy for that specific WTRU that has obtained a default bearer from the UPD 501 to the MPE takes place. Therefore at step 2s the MPE sets up a filter for that specific WTRU having the specific user identifier or IMSI. For any packet which is directed from/to the WTRU having the specific user identifier for which the filter has been set up by the MPE, the MPE checks whether there is a match between the filter policy downloaded and the packet analyzed. This check is made only if filter policies exist for the specific user.

The filters above are described with reference to FIG. 3. Therefore for example, each packet has to be checked regarding the destination IP address, e.g. if the IP address belongs to an allowed server or not; it has to be checked regarding the type of media communication session it is requesting (e.g. audio, video, etc.); it has to be checked regarding the amount of traffic already present in the network, the protocol type field (e.g. if the packet belong to allowed transport protocol), it has to be checked against the transport protocol destination port being used (e.g. if the port used is allowed), it has to be checked against the application protocol fields or messages such as SIP register (e.g. if the user is allowed to register to a certain server), SIP invite (e.g. if the user is allowed to initiate the communication towards a certain SIP user) etc.

Figure 11:
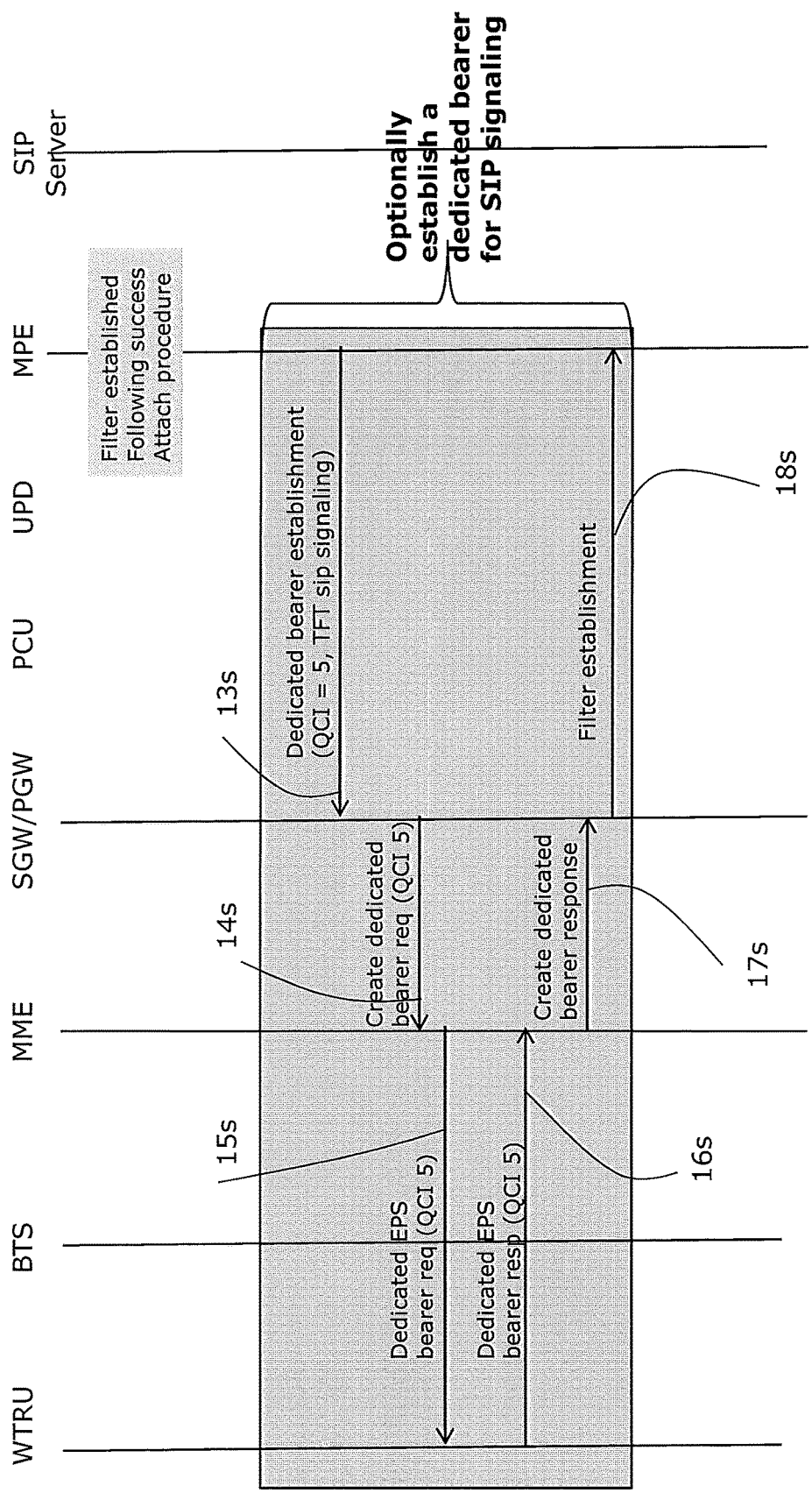
FIG. 11 is a diagram of an embodiment of the application of a different step of the method of the invention.

According to an optional phase of the invention, with now reference to FIG. 11, a dedicated bearer for SIP signaling is created. The Mobile Policy Engine MPE sends a command (step 13s) to the gateway SGW/PGW is order to request the same to create a dedicated bearer. Being the dedicated bearer a bearer for SIP signaling, the filter realized according to the invention directs all the SIP data traffic into the created dedicated bearer coming from the WTRU, on the basis of:

IP source address, IP destination address and UDP destination port (usually 5060).

As said the MPE of the invention is capable of analyzing all packets within the core network and therefore is also capable of filtering the same.

Preferably, dedicated bearer uses Traffic flow templates (TFT) to give special treatment to specific services.

The gateway SGW/PGW due to the command of step 13s received from the MPE instructs the MME—step 14s—to create the requested dedicated bearer. The dedicated bearer is realized as a "standard" dedicated bearer according to the used protocol. For example, the SGW can send as step 13s a GTP Create Bearer Request message with LBI, new QoS values, PTI and SGW FTEID for user plane to MME.

Upon reception of the Create Bearer Request, MME creates a NAS message Activate Dedicated Bearer Context Request, place it in a S1AP ERAB set up request and sends it to the base station. The base station reads the NAS message, stores the SGW user plane FTEID and QoS values. Then it forwards the NAS message to the WTRU in the RRC Re-configuration request. These two phases are summarized in phase 15s of FIG. 11.

This dedicated bearer for SIP signalling, or for any other type of signalling that can be used to give priority to when requesting a media session, such as HTTP Video streaming, VoIP sessions establishment, gaming, machine to machine communication, etc., can be created immediately after the establishment for the default bearer for a given WTRU (i.e. as soon as the default bearer is created, the MPE forces the SGW/PGW and MME to create a dedicated bearer for the signalling traffic, regardless of whether the WTRU has sent any signalling packet to request a media session.

Alternatively, the MPE can wait to instruct the MME to create the dedicated bearer for the signalling traffic for the first packet(s) of such signalling. For example, it can wait till it detects the first SIP signalling packets requesting a SIP attach.

Dedicated bearer can be GBR or non-GBR (whereas default bearer can only be non-GBR).

Regardless of the establishment of a dedicated bearer for signalling, the disclosed method includes a step of a creating of a dedicated bearer for the media traffic flow, if the conditions imposed by the filter are satisfied. The following is in detail an example of the method already described with reference to FIG. 7.

Referring now to FIG. 12, in the following, the establishment of a media communication session is described between the WTRU and an "end user". The end user can be a server, or an additional WTRU connected to the network. The following is described with reference to a VoIP communication session which uses Session Initiation Protocol (SIP) in order to start, modify and terminate the session, however any other media communication session and corresponding signalling protocols can be used.

Media sessions may be initiated by different protocols such as SIP, but also http, rtsp for video streaming, or also lower layer protocols such as L3 tunnel initialization, etc.

In order to begin the communication, as an example, a SIP invite is sent from the WTRU. The WTRU here indicated is the WTRU that in FIG. 10 attached to the network and for which a filter has been established by the MPE as soon as the default bearer has been created by the MME.

The INVITE is a SIP method that specifies the action that the requester (Calling Party) wants the receiver (Called Party) to take. The INVITE request contains a number of header fields. Header fields are named attributes that provide additional information about a message. The ones present in an INVITE include a unique identifier for the call, the destination address, Calling Party Address, Called Party Address and information about the type of session that the requester wishes to establish with the receiver.

The packets belonging to the SIP invite message, step 19s, may either flow into the dedicated bearer for SIP signalling if such a bearer has been established according to the optional phase of the disclosed method above described with reference to FIG. 11, or they can flow into the default bearer established according to steps 1 s-12s.

The SIP message is directed to the "end user" (i.e. Called Party) with which the WTRU wants to establish a communication, such as another WRTU, or to a SIP server (or SIP proxy) which can be only an intermediate destination of the SIP invite (e.g. SIP proxy or SIP server). For example, in case of VoIP calls, the SIP server is redirecting the invite message to another WTRU which may accept (or deny) the SIP invite.

Therefore, often the SIP invite message does not contain the final IP address of the "end user" which is normally not even known to the WTRU. The SIP invite thus preferably contains for example the IP address of a SIP proxy and the INVITE request is sent to the proxy. The body of the INVITE request carries an SDP (Session Description Protocol) message providing the parameters (codec, IP address, port) the called party will need to send its RTP stream to the caller. The SIP proxy, in this flow diagram of FIG. 12 identified with the "SIP server", responds with "100 Trying" and then forwards the INVITE request to the target end user (i.e. the WTRU to be contacted or even an additional server). The proxy server adds one Via: header to the message. In order to know the IP address of the final user, the SIP proxy has preferably access to a location database and thus knows the IP addresses of all registered users (the simplest implementation of this is such that the registrar server and the proxy are the same application).

The "end user" can accept the call (or disregard it) and it sends the response "200 OK", see phase 20s. The body of the response contains an SDP message so that the WTRU knows where to send his RTP stream. The proxy server forwards the response to the WTRU.

The WTRU confirms the receipt of "200 OK" with the ACK message (not shown). The proxy server forwards the ACK to the end user. At this point, the call has been established and both parties start sending their RTP streams, which is the media session of the present example. This method may be equally applied to other types of media streams that do not utilize RTP.

Therefore a media session has been established between the WTRU and the end user.

The MPE is capable of detecting and analyzing all the packets within the core network. We have also seen that for the specific WTRU sending the SIP invite a filter has been established by the MPE. Thus the MPE can detect from the analysis of packets' flow that a media communication session has been established between the WTRU and the end user. In addition, due to the analysis of the packets, the MPE can detect also the IP address of the end user, which may constantly change, as in the present example. In this example, the IP address of the SIP server is not the same as the IP address of the "end user", which is for example another WTRU to which the VoIP call was directed. The MPE has to be able to dynamically keep track of the IP address of the WTRU and of the end user of the media communication.

The mentioned SIP OK therefore can be sent either by the SIP server if this is the final user or by the final user such as the additional WTRU.

The packets from/to the WTRU for which the filter has been established are thus checked in the following way:

When the MPE has received a packet it has to retrieve the IP address of the end user to which it is directed and then to check whether the end user's IP address and/or Called Party Address (e.g. user identifier or phone number) is listed among the allowed IP addresses and numbers or identifiers (see elements 304, 306, 309 of the UPD in FIG. 6).

In the affirmative case, it is checked the type of media session which has been established. For example, the policy might allow dedicated bearer for voice but not for video or viceversa.

For VoIP traffic, the filter consists in IP source address, IP destination address, UDP source port and UDP destination address, in other words, all packets identified by such an IP source and destination, such a UDP source and destination are moved into the dedicated bearer which has been created by the MME forced by the MPE. Thus the voice packets can flow in the dedicated bearer having a better QoS than the default bearer.

If the packets satisfy all requirements written in the policy downloaded by the PCU into the MPE from the UPD (or alternatively already downloaded by the MPE from the UPD), a dedicated bearer is created in which the packets relating to the media communication session can flow (for example voice in the case of a VoIP connection).

Two possibilities according to the invention arise.

In a first scenario in which the dedicated bearer for the SIP signaling has been established according to steps 13s-18s, the MPE commands the gateway SGW/PGW to modify the existing dedicated bearer, step 21s. Preferably, the modification is such that the GBR is increased with respect to the GBR requested for the dedicated bearer used only for signaling transfer.

The change in GBR of the dedicated bearer, via the MME, is realized according to the standard, in particular in step 22s the gateway SGW/PGW, following the command given by the MPE (step 21s), sends a request to the MME to modify the dedicated bearer (step 22s), indicating the new QCI and GBR. The MME requests the base station and WTRU to modify the dedicated EPS bearer (23s) and the MME then receives a accept message of the modification (step 24s). The response is then forwarded to the gateway (step 25s) and an acknowledge of the modification send from the gateway to the MPE (step 26s).

It is to be understood that the dedicated bearer request is initialized by the MPE inside the core network, and not from the outside of the same. After steps 22s-25s for the establishment of the dedicated bearer already existing, the gateway sends an acknowledgement (step 26s) to the MPE to acknowledge the successful change in GBR of the dedicated bearer.

Alternatively, always with reference to the same numerals 21s-26s, in case no dedicated bearer for the SIP signaling is established, so that the SIP invite packets have been flowing into the default bearer, in step 21s the MPE, having understood from the packets' analysis that the WTRU for which the filter is active and a default bearer is established has also successfully established a media connection, send a command to the gateway in order to create a new dedicated bearer. The steps 22s-25s in which the dedicated bearer is created are analog to steps 14s-17s in which the dedicated bearer for SIP signaling has been created (the QoS might be different).

All packets relating to the media communication session (in this case voice of the VoIP call) are thus flowing inside the dedicated bearer so created (or changed), the MPE providing the necessary filters.

Figure 13:
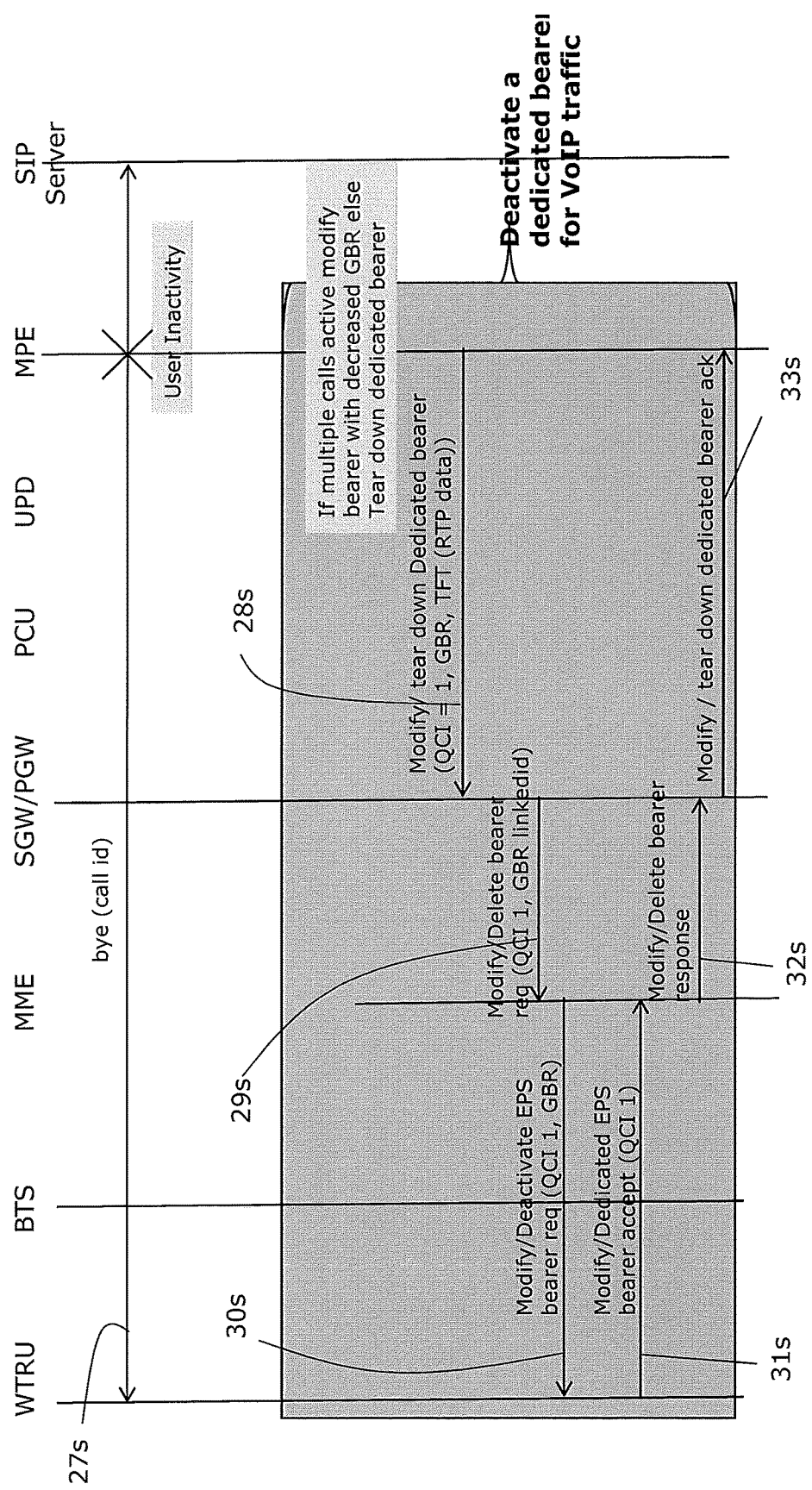
FIG. 13 is a diagram of an embodiment of the application of an even further step of the method of the invention.

As shown in FIG. 13, when one of the WTRU hangs up, it sends the request BYE and the SIP proxy forwards the message to the other party. The other party responds to the BYE request with "200 OK" (again, the proxy server forwards the response to the other side). Both parties stop sending RTP data and the call is over. This is the depicted step 27s.

The same can take place if one of the two parties is inactive. This inactivity may be determined by message 27s (BYE) or using an "inactivity detection" method. In the latter case the MPE may determine that inactivity has occurred when, over a given time period, it detects that no media packets have been exchanged by the WRTU. According to an optional phase of the invention, the GBR or anyhow the QoS of the dedicated bearer can change depending of the traffic flow in the network. For example, as described with reference to steps 22s-25s in which the GBR of the dedicated bearer has been increased, the GBR can also be decreased. With now reference to steps 29s-32s, following a command 28s from the MPE to the gateway to decrease the GBR of the dedicated bearer, the MME, the WTRU and the base station decrease the GBR of the dedicated bearer (in an analog way as described with reference to steps 22s-25s). Alternatively, instead of decreasing or anyhow modifying the QoS of the dedicated bearer, the same can be tore down, always following a command of the MPE.

At the end of the decreasing steps or tearing down steps 29s-32s, an acknowledge is sent to the MPE (step 33s).

The description of the establishment of a dedicated bearer with reference to a SIP procedure is applicable to any other media communication that the WTRU desires to establish with either another WTRU or with a server (such as the proxy server above described).

The MPE forces the core network, in particular forces the gateway and/or the MME to establish the dedicated bearer as soon as the media communication is established. The QoS of the dedicated bearer depends on the database, i.e. on the WTRU and its IMSI, on the location of the WTRU; on the traffic in the network and on the type of media communication requested.

As seen, the QoS can also change during the same session, if the conditions in the network changes.

Figure 14:
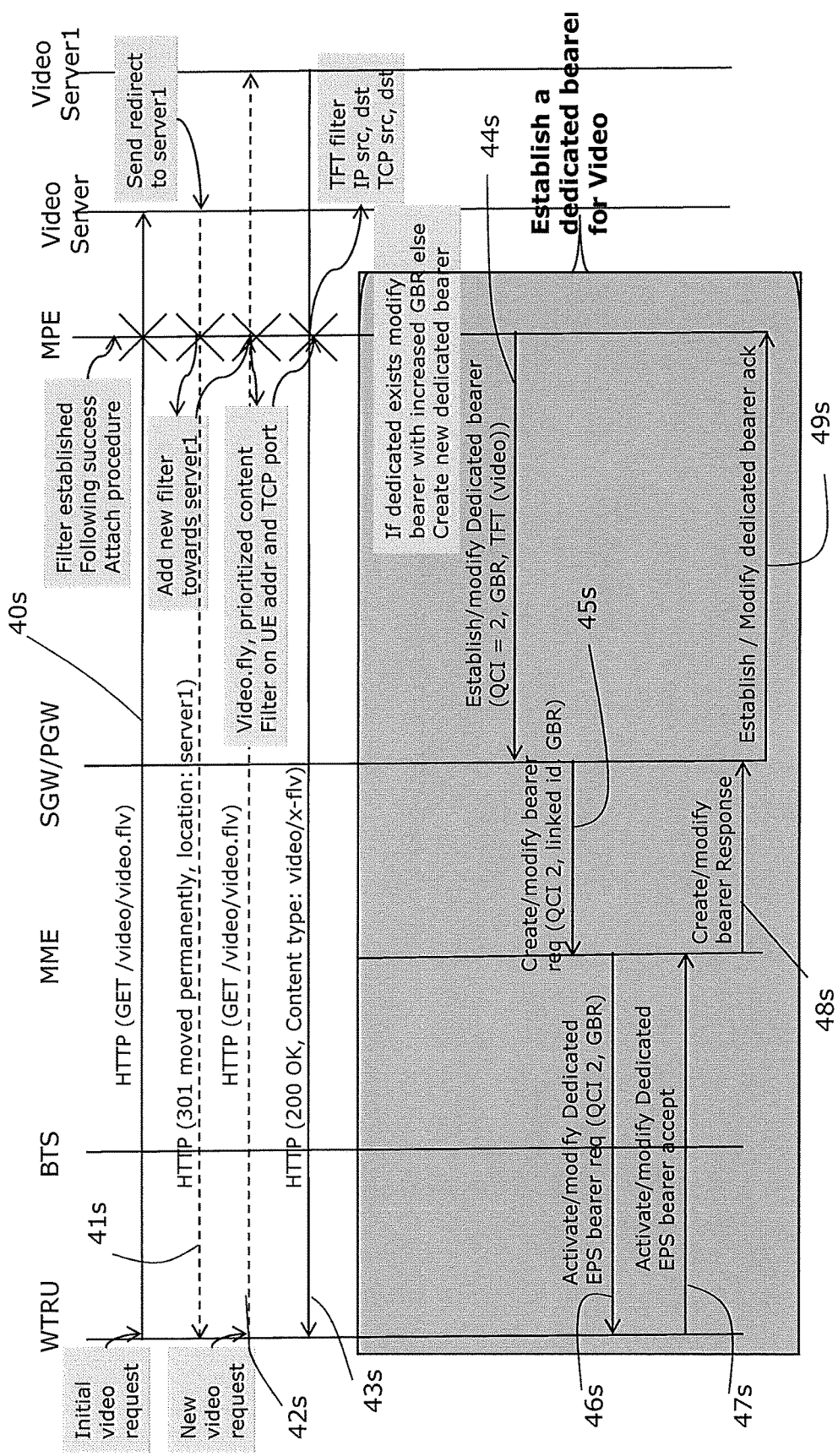
FIG. 14 is a diagram of an embodiment of the application of an additional step of the method of the invention.

With now reference to FIG. 14, assuming that steps 1s-12s has been already performed, i.e. the WTRU is attached to the network and a default bearer has been already established, the WTRU desires to have a media communication session which includes visualizing a given video named "video.flv".

Optionally, a dedicated bearer for a HTTP signaling can be established, as described for the SIP signaling in FIG. 11. (e.g. for all http GET, 200Ok and 301 messages that involves a specified video server IP address)

The WTRU thus sends a HTTP GET request to a video server 40s to get the required video.

Generally, a HTTP request message from a WTRU to a server includes, within the first line of that message, the method to be applied to the resource, in this case a GET procedure, the identifier of the resource, and the protocol version in use. Moreover, the absolute URI form is required when the request is being made to a proxy. The proxy is requested to forward the request or service it from a valid cache, and return the response. Note that the proxy may forward the request on to another proxy or directly to the server.

The MPE sets up a filter including the IP address of the video server which is the destination of the first HTTP GET request.

In the example, the response from the video server is a "301 Moved Permanently" 41s, which means that the requested video is not available because it has been permanently moved. In the 301 response, the video server also includes the IP address of the new server which contains the video, called server! The MPE thus changes the filters to take into account the new IP address of the "final destination" of the media session which is going to be established.

A new HTTP GET request 42s is thus sent by the WTRU to the new server 1 and in this case a 200 OK Response is obtained, i.e. the WTRU correctly downloaded the video 43s.

Again, at the establishment of the media connection, the packets are checked by the MPE and for the packets of the media connection a dedicated bearer can be created if the packets match all conditions of the policy.

Thus, the MPE 500 from an analysis of the packets flowing in the core networks and directed from/to the WTRU for which the policy has been downloaded, detects all the parameters to be checked with the policy rules. One such check includes verifying or having verified in said database whether said user is allowed to access said media stream. In case the parameters match the policy rules the dedicated bearer for such a communication session is established, i.e. all packets of the media session are flowing into the so created dedicated bearer.

For the http video reported in the example the filter should be the URL video (composed by the video IP address and the URI, which is the path for the content). In case a server redirect message is received the filter is updated to include the new URL of the video (composed by the IP address of the server to which the content was redirected and the URI). The filter that will map the prioritized content to the dedicated bearer would be composed by TCP source port (http in this case), TCP destination port, destination address (UE address) and source address (see above).

Having established the media connection after the 200 OK, as in FIG. 12, the MPE commands the gateway to create a dedicated bearer for the media session, in this case to visualize the requested video. As explained above, a dedicated bearer could be already present for the HTTP signaling, in this case the QoS of such an already existing dedicated bearer is changed (improved) or a completely new dedicated bearer is created.

Thus, the MPE commands the gateway to either modify or create a dedicated bearer (step 44s). The steps to realize the bearer 45s-498s are the same as per those described with reference to FIG. 12.

When the dedicated bearer is created, an acknowledgment is sent to the MPE (step 49s).

The invention claimed is:

1. A method for controlling media communication session between a user identified by a user identifier and a receiving equipment via a core network and a IP network external to said core network, said user accessing said core network via a radio access network and said core network including a gateway to said external IP network, the method including the steps of:
   a. Checking, when said user connects to said core network, a database to retrieve policy rules applicable to said user according to the user identifier and which relate to one or more media sessions;
   b. Identifying establishment of a default bearer for said user on said core network;
   c. Analyzing all traffic packets originating from or directed to said user between said access network and said core network and/or said gateway to said external IP network;
   d. Checking establishment of a requested media communication session between the user and the receiving equipment;
   e. Determining, for each packet belonging to the established media communication session, a type of media session requested and established, and IP addresses and ports of said user and said receiving equipment, between which the media session is established; and f. forcing the core network and/or radio access network and/or said gateway to create, if said policy rules allow, a dedicated bearer between said user and said gateway with Quality of Service for the packets belonging to the established media communication session, said Quality of Service depending on a specific media session, said dedicated bearer being established between the IP addresses and related ports of the established media communication session, said dedicated bearer being created on the basis of information retrievable from said packets belonging to said established media communication session and said database.

2. The method according to claim 1, wherein, before the creation of said dedicated bearer with Quality of Service for the packets belonging to the established media communication session, forcing the core network and/or said radio access network and/or said gateway to create, if said policy rules allow, an other dedicated bearer with Quality of Service for the packets belonging to the media session establishment signaling messages.

3. The method according to claim 1, wherein the step of forcing the core network and/or said radio access network and/or said gateway to create said dedicated bearer includes:
   a. Verifying in said database whether said user is allowed to establish media communication session of a type requested; and
   b. In the affirmative case, creating said dedicated bearer.

4. The method according to claim 3, wherein, in a negative case, it includes tearing down and/or blocking said media session between said user and said receiving equipment.

5. The method according to claim 1, wherein the step of forcing the core network and/or said radio access network and/or said gateway to create said dedicated bearer includes:
   a. Determining a geographical location of said user;
   b. Verifying in said database whether said user is allowed to establish the media communication session in said geographical location; and
   c. In the affirmative case, creating said dedicated bearer.

6. The method according to claim 1, wherein the step of forcing the core network and/or said radio access network and/or said gateway to create said dedicated bearer includes:
   a. Verifying in said database whether said user is allowed to establish the media communication session with said receiving equipment; and
   b. In the affirmative case, creating said dedicated bearer.

7. The method according to claim 1, wherein the step of forcing the core network and/or said radio access network and/or said gateway to create said dedicated bearer includes:
   a. Determining a media stream requested by said user;
   b. Verifying in said database whether said user is allowed to access said media stream; and
   c. In the affirmative case, creating said dedicated bearer.

8. The method according to claim 1, wherein said media session is a VoIP session or a streaming session.

9. The method according to claim 1, wherein said receiving equipment is an application server or a SIP server or another user.

10. The method according to claim 1, wherein said step of analyzing traffic packets includes detecting in said traffic packet one or more of:

IP address associated to the user;
the location of the user;
the IP address and TCP/UDP port of a server and/or additional user to which the user is allowed to communicate with;
the type of media session established; and
the IP address and TCP/UDP port of the server and/or additional user to which the user is not allowed to communicate with.

11. The method according to claim 1, wherein the Quality of Service for said dedicated bearer includes one or more of the following parameters: Guaranteed Bit Rate, Maximum Bit Rate, Quality of Service Class Identifier, Allocation and Retention Priority, Differentiated Services Code Point.

12. The method according to claim 1, including:
   a. Counting a number of media communication sessions performed by said user within a time frame; and
   b. Establishing said dedicated bearer only if said number of media sessions performed within said time frame is below a given threshold.

13. The method according to claim 1, including:
   a. Checking in said database a maximum uplink bitrate and/or a maximum downlink rate that said user is allowed to use; and
   b. Establishing said dedicated bearer only if said media communication session requires an uplink and/or downlink rate below said maximum uplink bitrate and/or said maximum downlink rate.

14. The method according to claim 1, including:
   a. Determining a traffic load of said core network; and
   b. Establishing said dedicated bearer only if said traffic load is below a given threshold.

15. The method according to claim 1, including:
   a. Verifying in said database a priority access value of said user;
   b. Comparing said priority access value with a stored emergency access value;
   c. Tearing down said dedicated bearer and/or blocking network access of one or more other users having a priority access value lower than said emergency value; and
   d. Establishing an other dedicated bearer for said user having said priority access value equal to or greater than said emergency access value.

16. The method according to claim 1, including:
   a. Verifying in said database a priority access value of said user;
   b. Comparing said priority access value with the priority access value of all other users, and determining a lowest priority access value;
   c. In case the priority access value of said user is greater than the lowest priority access value, tearing down said dedicated bearer or blocking network access of another user having said lowest priority access value; and
   d. Establishing an other dedicated bearer for said user having said priority access value greater than said lowest priority access value.

17. The method according to claim 1, wherein a priority access value of said user has a corresponding Quality of Service Allocation and Retention Priority value.

18. The method according to claim 1, wherein said step of analyzing the packets includes analyzing a packet between said gateway and said external IP network.

19. The method according to claim 1, wherein said core network is a LTE core network or a UMTS core network.

20. An apparatus configured to implement a policy control function in a telecommunication network for controlling a media communication session; said telecommunication network including a core network having a gateway to an external IP network, a radio access network, and the IP network external to said core network, the apparatus comprising:
   a. A database including policy rules applicable to users of said telecommunication network according to a user identifier and which relate to one or more media sessions;
   b. A first detector configured to identify establishment of a default bearer for a user on said core network;
   c. A second detector configured to identify establishment of a requested media communication session between the user and receiving equipment;
   d. An analyzer configured to analyze all traffic packets originating from or directed to said user between said access network and said core network and/or said gateway to said external IP network and to determine, for each packet belonging to the established media communication session, a type of media session requested and established, and IP addresses and ports of said user and said receiving equipment, between which the media session is established; and
   e. A policy enforcer configured to force said core network and/or said radio access network and/or said gateway to create, if said policy rules allow, a dedicated bearer between said user and said gateway with Quality of Service for the packets belonging to the established media communication session, said Quality of Service depending on a specific media session, said dedicated bearer being established between the IP addresses and related ports of the established media communication session, said dedicated bearer being created on the basis of information retrievable from said packets belonging to said established media communication session and said database.

21. The apparatus according to claim 20, wherein said first and second detector, said analyzer and said policy enforcer are part of the same node.

22. The apparatus according to claim 20, wherein said first and second detector, said analyzer and said policy enforcer are part of said core network.

23. The apparatus according to claim 20, wherein said first and second detector, said analyzer and said policy enforcer are part of said radio access network.

* * * * *